United States Patent
Numata et al.

(10) Patent No.: US 6,895,393 B1
(45) Date of Patent: May 17, 2005

(54) ELECTRONIC BOOK DISTRIBUTING SYSTEM BY USE OF PURCHASE CERTIFICATE AND DEVICES THEREFOR

(75) Inventors: Toru Numata, Yokohama (JP); Tadashi Kuwabara, Yokohama (JP); Hiroshi Shimizu, Yokohama (JP); Misuzu Mochizuki, Yokohama (JP); Yukinobu Tada, Ebina (JP); Naoki Yamamoto, Yokohama (JP); Yutaka Igarashi, Kamakura (JP); Shinichiro Fukushima, Yokohama (JP); Mayumi Ueyama, Adachi-ku (JP); Rituko Kanazawa, Kamakura (JP); Maki Furui, Taito-ku (JP); Katsuki Ikuta, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,056

(22) Filed: Oct. 1, 1999

(30) Foreign Application Priority Data

Oct. 1, 1998  (JP) ............................................ 10-279600

(51) Int. Cl.[7] .............................................. G06F 17/60
(52) U.S. Cl. ...................................................... 705/52
(58) Field of Search ............................. 705/26, 27, 52, 705/76

(56) References Cited

U.S. PATENT DOCUMENTS

| | | | |
|---|---|---|---|
| 5,937,158 A | * | 8/1999 | Uranaka ...................... 705/26 |
| 6,064,969 A | * | 5/2000 | Haskins ........................ 705/4 |
| 6,212,634 B1 | * | 4/2001 | Geer, Jr. et al. ............. 705/76 |

FOREIGN PATENT DOCUMENTS

| | | | |
|---|---|---|---|
| JP | 408090953 A | * | 4/1996 |
| JP | 02000113049 A | * | 4/2000 |

OTHER PUBLICATIONS

When online is not enough. (Editorial); v19, n3, p6 (2); German Nancy; May–Jun., 1995 p. 1.*

* cited by examiner

Primary Examiner—Pierre E. Elisca
(74) Attorney, Agent, or Firm—Mattingly, Stanger, Malur & Brundidge, P.C.

(57) ABSTRACT

For changing services to readers who desires to obtain electronic books exactly or minutely, an electronic book management system 1 distributes at least electronic purchase certificates relating to books which are stocked at a bookstores owing a bookstore terminal device 2, in advance, to that bookstore terminal device 2. When buying the book(s), a reader obtains in an IC card 4 owned by her/him a purchase certificate(s) of that book(s) which she/he bought, from the bookstore terminal 2. When ordering to obtain the electronic book(s), the reader transmits the purchase certificate(s) from a reader terminal device 3 to the electronic book management system 1 through a communication network 5. The electronic book management system 1 changes over it's service when supplying the electronic book(s) to that reader depending upon the existence of the purchase certificate(s).

17 Claims, 14 Drawing Sheets

| MANAGE-MENT CODE | NAME OF BOOK | PURCHASE CERTIFICATE | PRICE | ········ | CONTENTS INFORMATION |
|---|---|---|---|---|---|
| Mcode1 | Bname1 | PP1 | BP1 | ········ | TC1 |
|  |  |  |  |  |  |

FIG. 4

| ARTICLE CODE | ARTICLE TITLE | PURCHASER PRICE | NON-PURCHASER PRICE | ......... | ARTICLE SIZE |
|---|---|---|---|---|---|
| Ccode1 | Ctitle1 | BPP1 | NYP1 | ......... | IV1 |

FIG. 5

| ARTICLE CODE | MANAGE-MENT CODE | PURCHASE CERTIFICATE | READ KEY | ......... | ELECTRONIC ARTICLE |
|---|---|---|---|---|---|
| Ccode1 | Mcode1 | PP1 | Ck1 | ......... | Ck1 (EC1) |

FIG. 6

| ORDER NUMBER | ARTICLE CODE | PURCHASE CERTIFICATE CERTIFICATION | IC CARD PUBLIC KEY | ......... | APPLICATION DATE |
|---|---|---|---|---|---|
| Ono1 | Ccode1 | Yes / No | Pcd | ......... | OD1 |

FIG. 7

| MANAGEMENT CODE | NAME OF BOOK | PURCHASE CERTIFICATE | PRICE | ......... | CONTENTS INFORMATION |
|---|---|---|---|---|---|
| Mcode 1 | Bname 1 | Pst (PP1) | BP1 | ......... | TC1 |

FIG. 8

| MANAGE-MENT CODE | NAME OF BOOK | PURCHASE CERTIFICATE | PURCHASING DATE | ......... | CONTENTS INFORMATION |
|---|---|---|---|---|---|
| Mcode 1 | Bname 1 | Pcd (PP1) | PD1 | ......... | TC1 |
| | | | | | |

FIG. 9

| MANAGE-MENT CODE | NAME OF BOOK | PURCHASE CERTIFICATE | PURCHASING DATE | ......... | CONTENTS INFORMATION |
|---|---|---|---|---|---|
| Mcode 1 | Bname 1 | Pcd (PP1) | PD1 | ......... | TC1 |
| | | | | | |

FIG. 10

| ARTICLE CODE | MANAGE-MENT CODE | READ KEY | ELECTRONIC ARTICLE | ......... | READER'S ADDITIONAL INFORMATION |
|---|---|---|---|---|---|
| Ccode1 | Mcode1 | Pcd (Ck1) | Ck1 (EC1) | ......... | Rinfo1 |
| | | | | | |

FIG. 11

| ORDER NUMBER | ARTICLE CODE | ARTICLE TITLE | ......... | APPLICATION DATE |
|---|---|---|---|---|
| Ono1 | Ccode1 | Ctitle1 | ......... | OD1 |
| | | | | |

ELECTRONIC BOOK DISTRIBUTING SYSTEM BY USE OF PURCHASE CERTIFICATE AND DEVICES THEREFOR

BACKGROUND OF THE INVENTION

1. Field of the Invention

The present invention relates to an electronic distributing system and devices for use in distribution of electronic publications, and in particular relates to those to achieve a method for changing services by suppliers of the electronic publications to purchasers thereof.

2. Description of Prior Art

In those days, in addition to printed publications through a medium of paper, being represented by such as books and various kinds of magazines and photographs and so on, so-called "electronic publications or books" are available to be distributed or purchased.

On the contrary to the fact that the printed publications, for instance books, are distributed from publisher through bookstores to readers, necessarily together with the substance thereof, however for the electronic publications, there exist distribution modes without the substance thereof, for example, by copying and transmitting the electronic information thereof, other than distribution mode with the substance, in which it is recorded in a recording medium.

In relation to the books which are distributed and purchased after being printed and published, the information itself which are printed on those books, and/or additional information, and further revised or renewed ones thereof are converted into electronic data to be distributed and purchased as such the electronic publications or books.

In this instance, since a reader who purchased a book had already paid a price for the information printed on that book, there obviously or potentially exists a possibility that she/he may require to discriminate from a reader who has not yet bought in the service.

To this, it is necessary for the distributors or sellers of the electronic publications to decide on whether the person who wishes to obtain the electronic book has already bought a book relating to that electronic book or not, thereby to change the service to her/him.

However, in the mode of distribution, for example on a home page with charge, in which searching, reading and/or obtaining of the electronic books are permitted only for registered members, the service to be provided for the reader is changed, depending upon whether she/he who wishes to obtain the electronic books is a registered member or not. However, it is impossible to change the service to be provided more exactly or minutely depending upon the respective fact that the reader has already bought the book relating to each of the electronic books.

Also, in a method where a discount condition is written into a recording medium on which the electronic book is written in when it is purchased, for the next purchasing of the electronic book, as in an electronic information automatic vending system described in Japanese Patent Laying-Open No. Hei 8-96230 (1996), for example, it is impossible for the reader to receive the service in relation to obtaining the electronic book even if she/he has already purchased that book.

Also, for example in the mode where the publication is distributed or sold being attached with a recording medium into which the electronic book is stored, as is practiced in a part of the printed publications, it is possible to practice a service of providing the electronic books related to the respective books for at least the reader who has purchased those. There is, however, a problem that, other than the reader who bought that book, a third person obtaining another recording medium being recorded with that electronic book by copying thereof can also read that electronic book unfairly and/or illegally.

SUMMARY OF THE INVENTION

According to the present invention, for dissolving the problems mentioned above, an electronic book management system distributes at least electronic purchase certificates relating to the books which are stocked at the bookstores, in advance, to a bookstore terminal device owned by each bookstore. When buying the book(s), a reader obtains in an IC card owned by her/him the purchase certificate(s) of the book(s) which she/he bought, from the bookstore terminal. When ordering to obtain the electronic book(s), the reader transmits the purchase certificate(s) from a reader terminal device to the electronic book management system through communication network, if she/he has that certificate(s) of the book(s) relating to the electronic book(s). The electronic book management system changes over it's service when supplying the electronic book(s) to that reader depending upon the existence of the purchase certificate(s).

Further, the electronic book is written in code or encrypted so as to be readable only by use of a specific read key exclusively, and also the read key is encrypted for each IC card of the reader when the electronic book management system provides the electronic book, thereby to be unavailable for the third person.

BRIEF DESCRIPTION OF THE DRAWINGS

FIG. 4 is a view for explaining the structure of data of contents information TC with respect to books, in the embodiment of the present invention;

FIG. 5 is a view for explaining the structure of data being recorded in relation to an electronic book Ck(EC) which the electronic book management system 1 accumulates and manages within the memory apparatus thereof, in the embodiment of the present invention;

FIG. 6 is a view for explaining the structure of data of a history of receiving purchase orders from readers, which the electronic book management system 1 accumulates and manages within the memory apparatus thereof, in the embodiment of the present invention;

FIG. 7 is a view for explaining the structure of data being recorded in relation to the purchase certificate which a bookstore terminal device 2 accumulates and manages within a memory apparatus 24 thereof, in the embodiment of the present invention;

FIG. 8 is a view for explaining the structure of data being recorded in relation to the purchase certificate which an IC cord 4 memorizes and maintains within a RAM 43 thereof, in the embodiment of the present invention;

FIG. 9 is a view for explaining the structure of data being recorded in relation to the purchase certificate which a reader terminal device 3 accumulates and manages within a memory apparatus 34 thereof, in the embodiment of the present invention;

FIG. 10 is a view for explaining the structure of data being recorded in relation to the electronic book Ck(EC) which the reader terminal device 3 accumulates and manages within the memory apparatus 34 thereof, in the embodiment of the present invention;

FIG. 11 is a view for explaining the structure of data of a history of purchase order of electronic books, being produced within a memory apparatus 34 at least temporarily when the reader terminal device 3 orders to purchase the electronic book to the electronic book management system 1, in the embodiment of the present invention;

DETAILED DESCRIPTION OF PREFERRED EMBODIMENTS

Hereinafter, embodiments according to the present invention will be fully explained by referring to the attached drawings.

Hereinafter, a publication(s) which is printed and/or bounded as a book(s) is called by "book(s)", while an article(s) and/or a picture(s) in a form of electronic information and a collection of them is called by "an electronic book(s) (or., E Book(s) in figures) or publication(s)".

Figure 1:
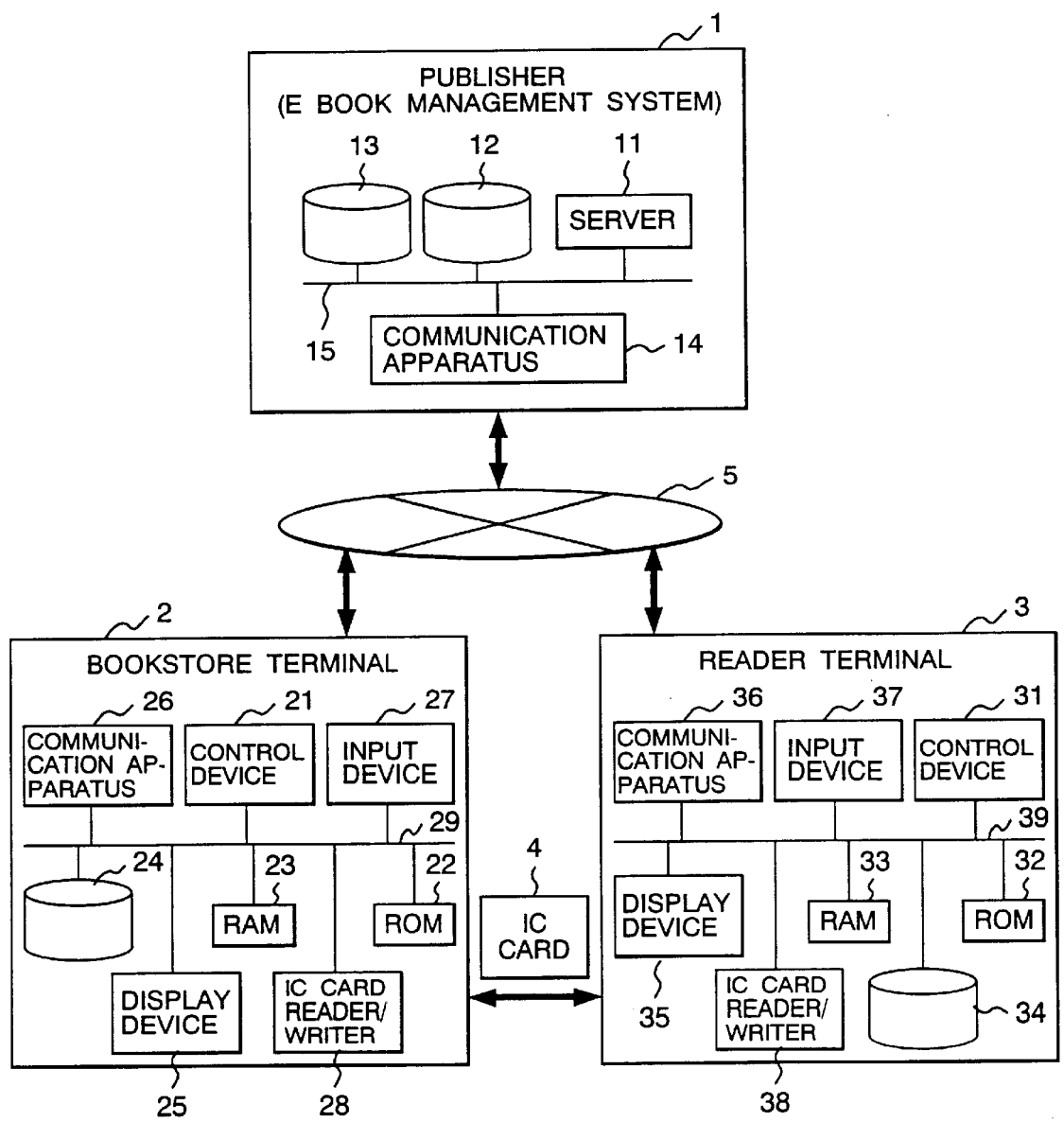
FIG. 1 is an outline view of an electronic book management system, according to an embodiment of the present invention.

FIG. 1 is a block diagram of showing an outline of a system according to an embodiment of the present invention. In the Fig., a reference numeral 1 indicates an electronic book management system of a publisher, 2 a terminal device located at a bookstore, 3 a terminal device of a reader, 4 an IC card owned by the reader, and 5 a telephone circuit network or a communication network, such as being represented by an Internet, for example. At least a part of the information, which is responded among the electronic book management system 1, the bookstore terminal device 2, the reader terminal device 3 and the IC card 4, is written in code or encrypted for the purpose of preventing from modification and/or illegal use by a third person.

The electronic book management system 1 comprises, at least, a management server 11 for managing electronic information, such as the electronic books, read keys for reading the electronic books, purchase certificates, etc.; a memory apparatus 12 for storing therein the electronic information, including such as contents information, as well as the electronic books, the read keys and the purchase certificates, etc.; a memory apparatus 13 for storing therein information, such as the bookstores and sale histories with respect to the readers; a communication apparatus 14 for utilizing the communication network 5; and a data network 15 connected to those apparatuses. The memory apparatuses 12 and 13, further, can be constructed with a plurality of sets of memory apparatus for each, or may be unified as a same memory apparatus.

Also, the electronic book management system 1 stores and/or manages public keys Ppb for publishers and secret keys Spb for publishers, and at least issues certifiers Spb (Pst), Spb(Pcd) and Spb(Prd) to each of the bookstore terminal devices, the IC cards and/or the reader terminal devices, or distributes the publisher public keys Ppb. The certifier Spb(P) which is obtained by writing the public key P owned by each can be issued only by the electronic book management system 1 having the publisher secret keys Spb. If trying to obtain and further to use the public keys P and the certifiers Spb(p) unfairly or illegally during responding process with a party, since the secret keys S will not be opened to an outside, therefore it is impossible for a third party to open the encoded information with the public key P which is certified, so as to use or read it.

The electronic book management system 1 stores and manages within the memory apparatus 12, at least management codes of books, the purchase certificates, the contents information, the electronic books Ck (EC) which are made from an article or articles or from picture(s) and so on, and the read keys Ck, by refering or relating them to one another. Here, the electronic books Ck(EC) were encoded previously, therefore it is impossible to unlock and read them without using the read key Ck being different for each of the electronic books. The electronic book management system 1 transmits at least the purchase certificates relating to the books which are ordered thereto, to the bookstore terminal device 2. The management codes, the titles of the books and/or contents information may be transmitted to the bookstore terminal device 2 separately, or transmitted together with that purchase certificates.

Also, the electronic book management system 1 decides whether it has the purchase certificate(s) in relation to the electronic book(s) on which an order is received, responding to the order of electronic book(s) from the reader terminal device 3, so as to change and provide a service to the reader, which is determined previously depending upon the condition of owing the certificate(s). The service to be changed at this time includes permission/non-permission for purchasing the electronic books, discount of purchase price, provision of additional information, and/or search assistance, etc., and they maybe different for each of the electronic books and the books.

The electronic book management system 1 transmits the electronic book(s) and/or read key(s) to the reader after payment process of price at the reader terminal device side. At this time, the read key Ck is encrypted by the public key Pcd of the IC card owned by the reader, thereby to be transmitted in a form of the Pcd(Ck).

The bookstore terminal device 2 comprises a control device 21 for executing, at least an encoding, unlocking of key, and various programs, such as for file management, ROMs 22 and 23 in which are recorded at least one or more of public key(s) Pst for the bookstore terminal device(s), the certifier(s) Spb(Pst) for the bookstore terminal device(s) and the public key(s) Ppb for the publisher(s), a memory apparatus 24 for storing therein the electronic information, such as at least the purchase certificate(s) obtained from the publisher(s) and/or the contents information, a display device 25, a communication device 26 for utilizing the communication network 5, an input device 27, an IC card reader/writer 28, a data bus 29, and so on.

The public key(s) Pst for the bookstore terminal(s) and the secret key(s) for the bookstore terminal Sst form a pair together with, and are different from each other for each the bookstore terminals.

The bookstore terminal 2 obtains at least the purchase certificate(s) PP from the electronic book management system 1, under the condition that it is encrypted by the public key(s) Pst for the bookstore(s), in relation to the books which are kept in stock at the bookstore itself, and stores it/them into the memory apparatus. At least one or more of the information, including the management code Mcode, the titles Bname and/or the book contents of each of the books is/are obtained at the same time when the purchase certificate(s) Pst(PP) is obtained or separately therefrom, thereby to be stored in relation to the purchase certificate(s) Pst(PP).

The reader goes to the bookstore by her/himself with carrying her/his own recordable IC card for selecting a book(s) to purchase, and conducts steps for purchasing by use of the bookstore terminal device 2.

In this time, the bookstore terminal 2 writes information into the IC card 4 which is set into the IC cord reader/writer 28, in relation to the book(s) which is/are sold, including the purchase certificate(s) thereof at least. At the time, the controller 21 of the bookstore terminal device 2, after searching and extracting Pst(PP) from the memory apparatus, unlocks by the secret key Sst of the bookstore terminal device, so as to write the Pcd(PP) into the IC card 4 by re-writing it in code or re-encrypting it with use of the IC card public key which is obtained from the IC card 4. However, it doesn't matter that the bookstore terminal device 2 writes into the IC card 4, at least one or more of the information, such as the management code Mcode, the name or title of the book Bname, the book contents TC, the date of purchase PD, the name of the purchasing bookstore, etc., together with the purchase certificate(s). With the information other than the purchase certificate(s) which are written into the IC card 4 by the bookstore terminal device 2, also it doesn't matter that at least a part of them is not encrypted by the public key Pst of the bookstore terminal device.

The reader terminal device 3 comprises, at least, a controller 31 for executing various programs, such as coding, unlock program(s), file management program(s), etc., ROMs 32 and 33, a memory apparatus 34 for storing therein the electronic information, such as the electronic book(s), the read key(s), the purchase certificate(s), the contents information, etc., a display device 35, a communication device 36 for utilizing the communication network 5, an input device 37, an IC card reader/writer 38, and a data bus 39.

Also, the reader terminal device 3 has a peculiar or specific reader terminal public key Prd, a reader terminal secret key Srd, a reader terminal certifier Spb(Prd) and a publisher public key Ppb, within a tamper-less program recorded in the ROM 32 and/or the memory apparatus 34 and/or within the ROM 32.

The reader terminal device 3 copies and/or shifts the information into the memory apparatus 34, including at least the purchase certificate(s) Pcd(PP) in relation to the book(s) being newly purchased, which is recorded in the IC card 4 set in the IC card reader/writer 38. In this instance, since the purchase certificate(s) Pcd is under the condition that it is encrypted by the public key Pcd of the IC card 4, therefore it is impossible to use the purchase certificate(s) without the IC card 4 having the public key Scd therein, even if a third person obtains a copy of the purchase certificate(s) Pcd(PP) from the memory apparatus 34.

When purchasing the electronic book(s), the reader terminal device 3 displays the contents information which is obtain from the IC card 4 together with the purchase certificate(s), and/or obtained separately from the electronic book management system 1. It sends a purchase order to the electronic book management system 1 from the communication device 36 via the communication network 5, attaching the purchase certificate(s) thereto when owing it thereby. When the purchase order is received, after proceeding the processes for payment of the price through such as settlement of accounts by electronic money, payment with a credit, and/or payment by cash, etc., the reader terminal device 3 receives from the electronic book management system 1 a transmission of at least one of the electronic book(s) Ck(EC) and the read key(s) Pcd(Ck). However, it doesn't matter for the electronic book(s) Ck(EC) and the read key(s) if the means for obtaining them from the electronic book management system 1 and send to the reader terminal device 3 is different from the mentioned above.

The electronic book(s) Ck(EC) and the read key(s) Pcd (Ck) obtained are recorded and accumulated into the memory apparatus, in relation to thereof mutually, and further to the other information.

When reading the electronic book(s), the electronic book to be read is selected from the contents information and a list of the obtained electronic book(s), and then the read key Pcd(Ck) corresponding to the selected electronic book Ck (EC) is searched, thereby to read it out. After being unlocked by the IC card 4, the read key Pcd(Ck) is re-encrypted by the reader terminal public key Prd, so as to be transmitted to the reader terminal device 3, again. The controller 31 unlocks the read key Prd(Ck) on a program for reading and/or an unlocking program which are called up from the above-mentioned programs for reading, thereby to pick up Ck on a temporary memory. Further, the controller 31 unlocks the electronic book Ck(EC) and picks up the information EC, and send it to the display device 35 to be readable thereon. Ck and EC exist only on the temporary memory and a display memory within the display device 35, but never be outputted outside the reader terminal device 3. Also, when reading the electronic book, it is necessary to unlock the read key and to re-encrypted it within the IC card 4 at every instance, therefore it is impossible to read the electronic book without the IC card which was used when obtaining the read key Pcd(Ck) for reading the purchase certificate (i.e., purchase certificate read key).

Figures 2, 3:
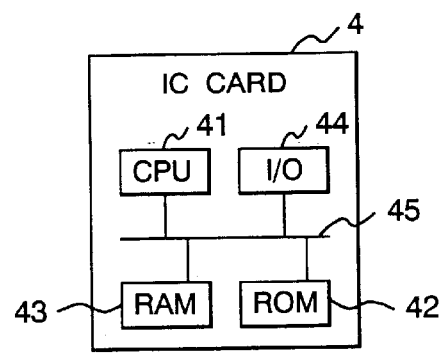
FIG. 2 is an outline view of the structure of an IC card in the embodiment of the present invention.
FIG. 3 is a view for explaining the structure of data being recorded in relation to a purchase certificate which the electronic book management system 1 accumulates and manages within a memory apparatus thereof, in the embodiment of the present invention.

FIG. 2 shows an outline of the construction of the IC card according to an embodiment of the present invention.

It comprises, at least, a CPU 41 for executing input and output control of data, unlocking and coding (encryption); programs to be executed by the CPU 41; a ROM 42 for recording therein at least one of the IC card public key Pcd, the IC card secret key Scd, the IC card certifier Spb and the publisher public key Ppb; a RAM 43 for recording therein at least the information of the book(s) being purchased; an interface 44 for the IC card reader/writer; and a data bus 45. The IC card public key Pcd and the IC card secret key Scd form a pair with each other, and are different from for each of the IC cards.

The IC card 4 unlocks the purchase certificate(s) Pcd(PP) and/or the read key(s) Pcd(Ck) on the temporary memory by means of the CPU 41, however since it is encrypted again when being outputted outside, there is no chance that important information PP and Ck are outputted outside directly.

It doesn't matter if the purchase certificate(s) Pcd(PP) and the read key(s) Pcd(Ck) which IC card 4 unlocks are recorded or memorized in the RAM 43, or is send from the reader terminal device 3.

FIG. 3 is a view for explaining an example of the construction in the data which are recorded, in particular, in relation to the purchase certificate which the electronic book management system 1 accumulates and manage in the memory apparatus thereof.

For the purchase certificate PP which is issued inherently or specifically for each of the books published, at least one or more of the information, such as the management code Mcode, the book title Bname, the price BP and the contents information TC, is stored in the memory apparatus in relation thereto.

In the figure, structural elements are listed up on one data table, but they may lie on a plurality of data tables having a structural element(s) being common to one another. Also, it doesn't matter if at least a part of the information described on the data table is data address for reading out an actual structural element(s) and/or the name of data. Further, also it doesn't matter if the structural elements are different in the order of listing up on the table.

FIG. 4 is a view for explaining an example of the data construction, in particular of the contents information TC for the books, according to the one embodiment of the present invention.

The contents information comprises at least an article code Ccode and a title of article Ctitle for each unit of the electronic books. Further, it may include at least one or more of information, such as a price BPP for the purchaser who has the purchase certificate of that book related thereto, a price NYP for the non-purchaser who has not the purchase certificate of that book related thereto, a size IV of articles, and so on. For example, in a case where the purchaser price BPP and the non-purchaser price are contained in the contents information, it is possible to provide service with changing the price of the electronic book depending upon the fact whether the person ordering purchase of that electronic book owns the purchase certificate thereof or not.

In the figure, though the contents information TC is presented in a form of the data table, however it may be presented in a form of describing languages, such as HTML for example. Also, the contents information TC can be encrypted for preventing from modification therein.

FIG. 5 is a view for explaining an example of the construction of the data, being recorded in relation to the electronic book Ck(EC), which the electronic book management system 1 accumulates and manages within the memory apparatus thereof, according to the embodiment of the present invention.

The electronic book Ck(EC) is recorded, at least in relation to the article code Ccode and the read key Ck, however it also can be stored within the memory apparatus, further in relation to, including the management code Mcode and the purchase certificate PP of that book which is related to the electronic book. In the figure, though the structural elements are listed up on only one data table, however they also may be listed up on a plurality of data tables having structural element(s) being common to one another. Further, a part of the information which is described on the data table may be the data address and/or data name for reading out the actual structural element(s) therewith. And further, the structural elements may be different in the order of listing up on the table.

FIG. 6 is a view for explaining an example of the data construction of a history of receiving purchase orders from the readers, which the electronic book management system 1 accumulates and manage within the memory apparatus thereof, according to the embodiment of the present invention.

The purchase order receiving history is recorded or memorized, each including at least one or more of information, such as an order number Ono, an article code Ccode, a result of confirmation or certification of the purchase certificate(s), the IC card public key(s) Pcd, and a date of order OD. The purchase order receiving history, however may further include a personal information, such as the name of the reader and ID of the IC card which was used for that purchase order.

In the figure, though the structural elements are listed up only on one data table, however also they may be listed up on a plurality of data tables having structural elements being common to one another. Further, a part of the information which is described on the data table may be the data address and/or data name for reading out the actual structural element(s) therewith. And further, the structural elements may be different in the order of listing up on the table.

Also, the purchase order receiving history may be one which can be deleted at least a part thereof after satisfying a certain condition, such as a certain time period after the reception thereof.

FIG. 7 is a view for explaining an example of the construction of the data, being recorded in relation to the purchase certificate(s), which the bookstore terminal device 3 accumulates and manages within the memory apparatus 24 thereof, according to the embodiment of the present invention.

In relation to the purchase certificate(s) Pst(PP) which the bookstore terminal device 3 obtains, at least one or more information is recorded, such as the management code Mcode, the book name Bname, the price BP and the contents information TC.

In the figure, though the structural elements are listed up only on one data table, however they can be listed up on a plurality of data tables having structural element(s) being common to one another. Further, a part of the information which is described on the data table may be the data address and/or data name for reading out the actual structural element(s) therewith. And further, the structural elements may be different in the order of listing up thereon.

For example, the management code Mcode is inputted by means of an input device, such as a bar code reader or a scanner, etc., and it is used for the purpose of reading out the related information, including the purchase certificate(s) Pst(PP), in advance to the writing thereof into the IC card, as well as of reading out the price BP for use in accounting calculations.

FIG. 8 is a view for explaining an example of the construction of the data, being recorded in relation to the purchase certificate(s), which the IC card 4 records and manage within the RAM 43 thereof, according to the embodiment of the present invention.

In relation to the purchase certificate(s) Pst(PP), at least one or more information is recorded within the RAM 43, such as the management code Mcode, the book name Bname, the purchase date and time PD, and the contents information TC.

In the figure, though the structural elements are listed up only on one data table, however they may be listed up on a plurality of data tables having structural element(s) being common to one another. Further, a part of the information which is described on the data table may be the data address and/or data name for reading out the actual structural element(s) therewith. And further, the structural elements may be different in the order of listing up thereon. Further, they also may be ones that are recorded continuously, being attached with identifiers being indicative of a head and an end of the recording area of the purchase certificate and the related information, for each one of the books.

Also, in a case where there is shortage in the remaining memory capacity in the RAM 43 for writing the purchase certificate(s) and the related information for all of the books which are purchased, it doesn't matter that the information of low priority among the related information, except for the purchase certificate(s), are not recorded therein. However, in this case, it is preferable that the information being eliminated is complemented by the bookstore terminal device 3 or obtained separately from the electronic book management system 1 later, depending upon the necessity thereof.

FIG. 9 is a view for explaining an example of the construction of the data, being recorded in relation to the purchase certificate(s), which the reader terminal device 3 accumulates and manages within the memory apparatus 34 thereof, according to the embodiment of the present invention.

In relation to the purchase certificate(s) Pcd(PP), at least one or more information is recorded within the RAM 34, such as the management code Mcode, the book name Bname, the purchase date and time PD, and the contents information TC.

In the figure, though the structure elements are listed up only one data table, however they also may be listed up on a plurality of data tables having structural element(s) being common to one another. Further, a part of the information which is described on the data table may be the data address and/or data name for reading out the actual structural element(s) therewith. And further, the structural elements also may be different in the order of listing up thereof.

FIG. 10 is a view for explaining an example of the construction in the data, being recorded in relation to the electronic book Ck(EC), which the reader terminal device 3 accumulates and manages within the memory apparatus 34 thereof, according to the embodiment of the present invention.

The read key Pcd(Ck) forming the pair is recorded in relation to the electronic book Ck(EC) at least, and further, at least one or more of information is recorded in relation thereto, such as the article code Ccode, the management code Mcode, the article title Ctitle and an additional reader information Rinf. Here, the additional reader information means the information which the reader records later in addition to the electronic book Ck(EC) obtained, such as a tag or label information, underline information, and/or information written therein, etc.

In the figure, though the structure elements are listed up on only one data table, however they also listed up on a plurality of data tables having structural element(s) being common to one another. Further, a part of the information which is described on the data table may be the data address and/or data name for reading out the actual structural element(s) therewith. And further, the structural elements may be different in the order of listing up thereon.

FIG. 11 is a view for explaining an example of the construction in the data of the electronic book purchase order receiving history, being produced or generated in the memory apparatus 34 at least temporarily when reader terminal device 3 sends a purchase orders for electronic book(s) to the electronic book management system 1, according to the embodiment of the present invention.

There are recorded, including at least the order number Ono, and further at least one or more of information, such as the article code C code, article title Ctitle and the purchase date and time, in relation to the order number Ono. This order number Ono is so related that, it is equal to the order number Ono owned within the purchase order receiving history which the electronic book management system 1 accumulates and manages within the memory apparatus thereof, or is related to be able to be identified therewith.

In a case where at least one of the electronic book Ck(EC) and the read key which the reader terminal device 3 obtains is broken in a route of obtaining, the reader terminal device 3 makes a transmission requirement again, including at least the order number Ono on the basis of the electronic book purchase order receiving history.

In a case where it is ascertained that the electronic book Ck(EC) and the read key Ck are in normal, it doesn't matter that the related information may be deleted from the electronic book purchase order receiving history.

Figure 12:
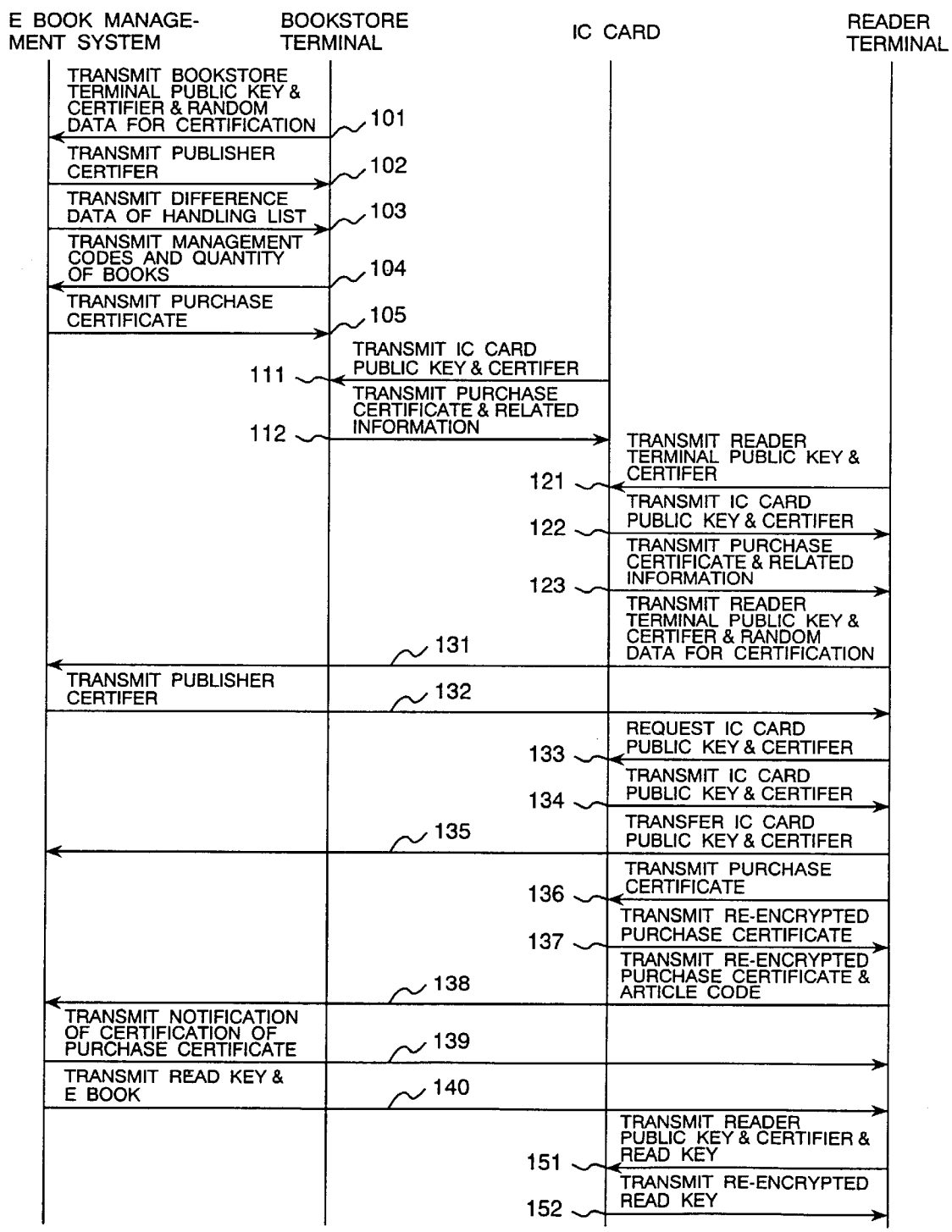
FIG. 12 is a view for explaining information responded among the electronic book management system 1, the bookstore terminal device 2, the reader terminal device 3 and the IC card 4, in the embodiment of the present invention.

FIG. 12 is a view for explaining in brief on the information which is responded among the electronic book management system 1, the bookstore terminal device 2, the reader terminal device 3 and the IC card 4, according to the embodiment of the present invention.

However, since the means which are practiced in the conventional art are applied to, for processes of connection and cut-off between the elements and of payment for price, here is omitted the description of thereof.

Processes for issuing the purchase certificate(s) which is conducted between the electronic book management system 1 and the bookstore terminal device 2 are as follows, in brief.

After completing the connection process between the electronic book management system 1 and the bookstore terminal device 2, the bookstore terminal device 2 transmits the bookstore terminal public key Pst, the bookstore terminal certifier Spb(Pst) and a random access data RD (101). The electronic book management system 1 opens or unlocks the bookstore terminal certifier Spb(Pst) by the publisher public key Ppb received thereby, so as to compare it to the public key Pst of the bookstore terminal from which the information being picked up is transmitted. When they are consistent with, it certifies the reader terminal device 3 connected to be a proper party, and at the same time memorizes therein the bookstore terminal public key Pst, temporarily.

Next, the electronic book management system 1 transmits the publisher certifier Spb (RD) which is obtained through writing the random data RD in code or encrypting by the publisher secret key Spb (102). The bookstore terminal device 3 unlocks the publisher certifier Spb (RD) by the publisher secret key Spb which it owns by itself, and compares the information picked up with the random data which is transmitted by itself. When they are consistent with, it is certified that it is connected with the intended electronic book management system 1 correctly.

The electronic book management system 1 transmits a renewal data and/or a difference data if a list of handling books is renewed (103) afterward from the previous connection time with the bookstore terminal device 2. Upon the basis of the data received, the bookstore terminal device 2 renews the handing list owned by itself.

Selecting the book to be ordered from the handling list, the bookstore terminal device 2 transmits the management code Mcode and quantity thereof (104). The electronic book management system 1 informs the received management code Mcode and quantity to a section in charge of controlling distribution and inventory of books, and at the same time, it looks up the related information including the purchase certificate PP upon the basis of the management code Mcode, so as to read it out. Further, among the information readout, at least the purchase certificate PP is encrypted by the bookstore terminal public key Pst which is received in advance. And, the electronic book management system 1 transmits at least the purchase certificate Pst (PP) and further the information related thereto, to the bookstore terminal device 2 (105). The bookstore terminal device 2 stores the purchase certificate Pst (PP) and the related information into the memory apparatus 24 in relation to at least a part of the information which is described in the handling list, and at the same time cuts off the connection with the electronic book management system 1. Among those information which are transmitted in the above steps 103, 104 and 105, it is preferable that at least the information, on which an electronic signature is required, is written in code or encrypted by the secret key of the transmitter side.

Next, explanation will be given on the responses which are conducted between the bookstore terminal device 2 and the IC card 4, when the reader purchases the book.

After the reader pays the price for the book(s) which she/he purchases, the bookstore terminal device 2 conducts the process for connection between the IC card 4 which is set in the IC card deader/writer. Next, the IC card 4 transmits the IC card public key Pcd and the IC card certifier Spb(Pcd) (111). The reader terminal device 3 unlocks the IC card certifier Spb(Pcd) by the publisher public key Ppb which is owned by itself, and compares the information picked up with the IC card public key Pcd. If they are consistent with, it is certified to be a regular IC card. And, the bookstore terminal device 2 looks up the purchase certificate Pst(PP) and the information related thereto, so as to read out, and after unlocking them by means of the bookstore terminal secret key Sst owned by itself, then it encrypts at least the purchase certificate Pst (PP) with use of the IC card public key Pcd, again. After transmitting the purchase certificates Pcd(PP) and the information related thereto for all the books on which the purchase certificates are required to be written (112), the bookstore terminal device 2 conducts the cut-off process from the IC card 4. Though not shown in the figure, there may be further included a transmission of customer information from the IC card 4 to the reader terminal device 3, a notification of the remaining memory capacity in the IC card to the bookstore terminal device 2, and/or a response for confirming the information which was written into the IC card 4, other than those mentioned above.

Next, explanation will be given on the responses relating to the purchase certificate, which are conducted between the IC card 4 and the reader terminal device 3 after the reader purchased the book.

The reader terminal device 3 conducts the process for connection between the IC card 4 which is set in the IC card reader/writer, and thereafter it transmits the reader terminal public key Prd and the reader terminal certifier Spb(Prd) to the IC card 4 (121). The IC card 4 unlocks the reader terminal certifier Spb (Prd) received by means of the publisher public key Ppb which it owns by itself, so as to compare the information picked up to the received reader terminal public key Prd, and then certifies the reader terminal device 3 to be the regular party when they are consistent with. The IC card 4 transmits the IC card public key Pcd and the IC card certifier Spb(Pcd) to the reader terminal device 3 (122). In the same manner, also the reader terminal device 3 conducts the certification of, whether the IC card 4 is the regular party or not, from the information received therewith. After mutual certification to each other, the IC card 4 transmits the newly obtained purchase certificate Pcd(PP) written therein and other information related thereto, to the reader terminal device 3 (123). The decision on whether the purchase certificate and the information related thereto being written therein are new or not, it may be made by means of, i.e., managing the history of transmission to the reader terminal device 3 in the form of a flag information, or through not shown in the figure, obtaining time information on the final renewal date and time from the reader terminal device 3, so as to decide the information obtained thereafter to be new, or transmitting all the purchase certificate(s) and/or the management codes which are stored, once, thereby inferring only the information not stored in the reader terminal device 3 to be new, so as to transmit the remaining related information in addition thereto.

Next, explanation will be given on the responses conducted among three parties, i.e., the reader terminal device 3, the IC card 4 and the electronic book management system 1 when the electronic book(s) is ordered to purchase and obtained.

After conducting the process for connection with the electronic book management system 1, the reader terminal device 3 transmits the reader terminal public key Prd, the reader terminal identifier Spb(Prd) and the random data RD (131). The electronic book management system 1 unlocks the reader terminal identifier Spb(Prd) by the publisher public key Ppb, so as to compare the information picked up to the reader terminal public key Prd received. If they are consistent with, the party is certified to be the regular reader terminal device. When succeeding in the certification, the electronic book management system 1 encrypts the received random data RD by the publisher secret key Spb, so as to send it to the reader terminal device 3 as a publisher certifier Spb (RD). The reader terminal device 3 unlocks the received publisher certifier Spb (RD) by the publisher public key Ppb, so as to compare it to the random data RD which was transmitted by itself. When they are consistent with, it is certified that it is connected to the electronic book management system 1 correctly.

Further, the reader terminal device 3 requires the IC card public key Pcd and the IC card certifer Spb(Pcd) to the IC card 4 being set therein (133), and then transfers the information transmitted from the IC card 4 (134) to the electronic book management system 1 (135). Here, the electronic book management system 1 also conducts the certification on the IC card 4 which is set into the reader terminal device 3. Next, the reader terminal device 3 transmits the purchase certificate Pcd(PP) into the IC card 4 (136), and then requires changes in the purchase certificate.

After unlocking the received purchase certificate Pcd(PP) by the IC card secret key Scd owned itself, the IC card 4 generates or produces Scd(PP) through re-encryption thereof by the IC card secret key Ppb, temporarily. Further, Ppb(Scd(PP)) is obtained by encrypting this by the publisher public key Ppb. The IC card 4 transmits this Ppb(Scd(PP)) to the reader terminal device 3 as a re-encrypted purchase certificate (137). The reader terminal device 3 transmits the received Ppb(Scd(PP)) to the electronic book management system 1, together with the article code Ccode of the electronic book on which the purchase order was given and/or the management code Mcode thereof (138). The electronic book management system 1 unlocks that Ppb(Scd (PP)) by the publisher secret key Spb and the IC card public key Pcd, so as to pick up pure or unprocessed information PP of the purchase certificate, thereby to compare it with the purchase certificate PP which is also related to the received article code Ccode and/or the management code Mcode in the same manner. When both are consistent with to each other, the electronic book management system 1 transmits a certification notice of the purchase certificate to the reader terminal device 3, assuming that the reader owns that purchase certificate (139).

After that, upon executing the payment process on the price for the electronic book(s) purchased between the electronic book management system 1 and the reader terminal device 3 and/or the IC card 4, the electronic book management system 1 transmits the read key Pcd(Ck) which is encrypted by the IC card public key Pcd and/or by the Ck(EC) to the reader terminal device 3 (140). The reader terminal device 3 stores the information received in relation to the article code Ccode and so on, into the memory apparatus thereof.

Also, not shown in the figure, the reader terminal device 3 searches for data breakage on the read key Pcd(Ck) and/or the Ck (EC) which are received, by means of parity check and/or execution of reading thereof, and it may requires re-transmission of a part or a whole of it/them to the electronic book management system 1 when the data breakage is acknowledged therein. Also, the responses in the steps 134, 135, 137 and/or 138 may be executed before the timings mentioned in the above, as far as no conflicting occurs therein.

Next, explanation will be given on the responses conducted between the reader terminal device 3 and the IC card 4 when reading the electronic book which was obtained.

After conducting the process for connection with the IC card 4, the reader terminal device 3 transmits the reader terminal public key Prd, the reader terminal certifier Spb (Prd) and the read key Pcd(Ck) to the IC card 4 (151). The IC card 4, at first, conducts the certification on the reader terminal device 3, and when succeeding in the certification, after unlocking the read key Pcd(Ck) received by the IC card secret key Scd, it encrypts it again by the reader terminal public key Prd. The IC card 4 transmits this read key Prd(Ck) which is encrypted again to the reader terminal device 3 (152). The reader terminal device 3 unlocks the received read key Prd(Ck) by the reader terminal secret key Srd, so as to pick up the key Ck on the temporary memory, and further it unlocks the electronic book Ck(EC) by use of this, thereby displaying it on the display device 35 to be readable.

As is mentioned in the above, at least the purchase certificate and the read key are encrypted by the public key of the receiving party when they are transmitted, as well as are still encrypted during when they are stored in the bookstore terminal device 2, the reader terminal device 3 and the IC card 4. Also, the electronic book is always under the condition of being encrypted, except for when it lies on the program(s) operating on the reader terminal device.

Accordingly, if the third party obtains at least the purchase certificate, the read key, and/or the electronic book when it/they is/are transmitted and/or stored, it is impossible for it to receive service unfairly, or to read the electronic book without the reading right thereof.

Figure 13:
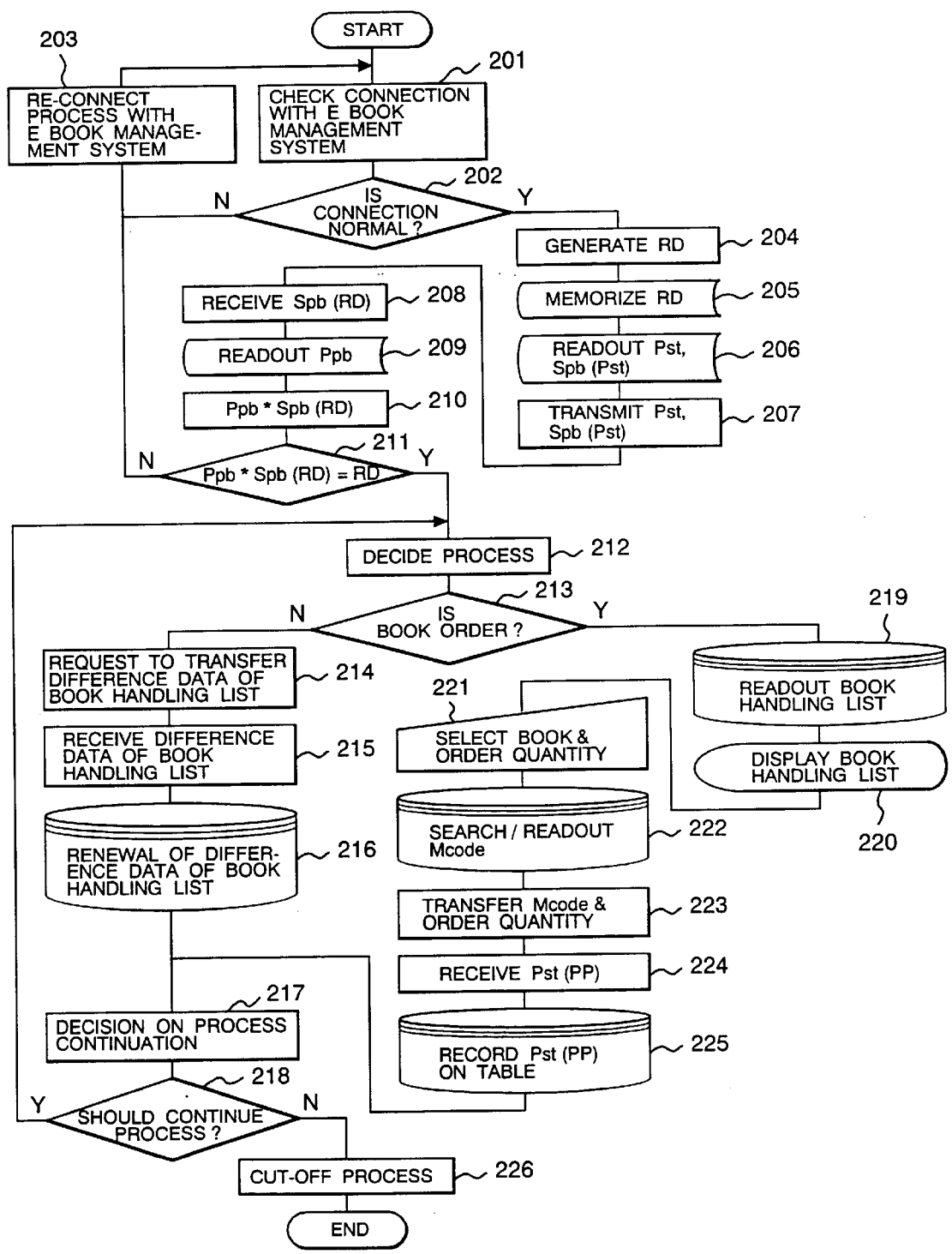
FIG. 13 is a flow chart for explaining flow of processes in the bookstore terminal device 2 when connecting to the electronic book management system 1, in the embodiment of the present invention.

FIG. 13 shows a flow chart for explaining a flow of processing in the bookstore terminal device 2 when it is connected to the electronic book management system 1, according to the embodiment of the present invention. Hereinafter, explanation will be given on the flow of the processing in the controller 21 of the bookstore terminal device 2, in the order of steps 201–226 shown in FIG. 13.

First of all, a check is made on connecting condition of the communication apparatus 26 with the electronic book management system 1 in a step 201. When the connection condition is decided to be in abnormal according to the decision made in a step 202, the process is shifted to a step 203, so as to re-execute the process for connecting the communication apparatus 26 with the electronic book management system 1, and it turns back to the step 201. When the connection condition is in normal according to the decision in the step 202, the process is shifted to a step 204, in which the random data RD is generated in random, and the random data RD is memorized in the RAM 23 in a step 205. Next, in a step 206, it reads out the bookstore terminal public key Pst and the bookstore terminal certifier Spb(Pst), which are stored in the ROM 22 and/or the memory apparatus 24, and in a step 207, it transmits the bookstore terminal public key Pst and the bookstore terminal certifier Spb(Pst) from the communication apparatus 26 to the electronic book management system 1, together with the random data RD.

In a step 208, it receives the publisher certifier Spb (RD) which is transmitted from the electronic book management system 1, by the communication apparatus 26 thereof, thereby to obtain it. In a step 209, it reads out the publisher public key Ppb which is stored in the ROM and/or the memory apparatus, so as to unlock the above-mentioned publisher certifier Spb (RD) with use of this in a step 210. In a decision in a step 211, if the result of unlocking in the step 210 differs from or inconsistent with the random data RD which is memorized in the RAM 23, the process is shifted to a step 203. On a while, when it coincides with, the process is shifted to a decision for processes thereafter in a step 212. In this step 212, namely it is decided, that a series of processes to be executed next should be done for ordering the book, or for renewing the handling list of books which is recorded in the memory apparatus 24. Here, the decision may be diverged or switched over by an external input from the input device 27, or made on a condition for decision which is defined in advance (for example, whether it is a first decision on the processing, or not after the date of an internal timer is renewed), or upon the existence of the notice on renewal of the handling list which is received from the electronic book management system 1. In the step 213, as the result of the decision made on the processing in the step 212, if it is decided not to be the process for book order, the process is shifted into a step 214, and it enters into a series of processes for the renewal of the handling list of books.

In the step 214, a request for transmission of the renewal data on the handling list of books or the difference data thereof is transmitted from the communication apparatus 26 to the electronic book management system 1. In a step 215, the controller device 21 receives the renewal data on the handling list of books or the difference data, and in a step 216, on the basis thereof, it conducts the writing in addition and/or rewriting on the handling list which is recorded in the memory apparatus 24, thereby renewing the list. Next, the process is shifted to a decision on whether the process should be continued or not, in a step 217.

Also in the step 213, when the process for ordering the book is decided to be taken as the result of the decision in the step 212, the process is shifted to a step 219, thereby entering into the series of processes related to the book ordering. In the step 219, the controller 21 reads out the handling list which the electronic book management system 1 handles, and in a step 220, it displays on the display device 25, a part or all the information described in the handling list, including such as the book name at least. In a step 221, the book(s) to be ordered and the quantity thereof are selected and designated through the external input with the input device 27. In a step 222, from the handling list and/or the related information which is recorded within the memory apparatus 24, the management code Mcode(s) for the selected book(s) is searched to be read out therefrom. In a step 224, at least the book(s) to be ordered and the quantity thereof are transmitted from the communication device 26 to the electronic book management system 1. Though not shown in the figure, it is preferable that the information which is transmitted in the step 223 is encrypted by the bookstore terminal secret key Sst and attached with the electronic signature. Then, it receives the information relating to the book(s) being ordered, including at least the purchase certificate Pst (PP) in the step 224, and records them into the memory apparatus 24 with relating to each other, in a step 225. And, it shifts the process into for decision on whether the process should be continued or not, in the step 217.

In the step 217, it is decided to continue the processes for the bookstore terminal device 3 or not, in accordance with, for example, the external input from the input device 27. In a step 218, when it is decided to continue the processes as the result of the judgments made in the step 217, the step is turned back to the step 212. While, when it is decided not to continue, then the processes for the bookstore terminal device 3 are ended or terminated through the cut-off process in the step 226.

Figure 14:
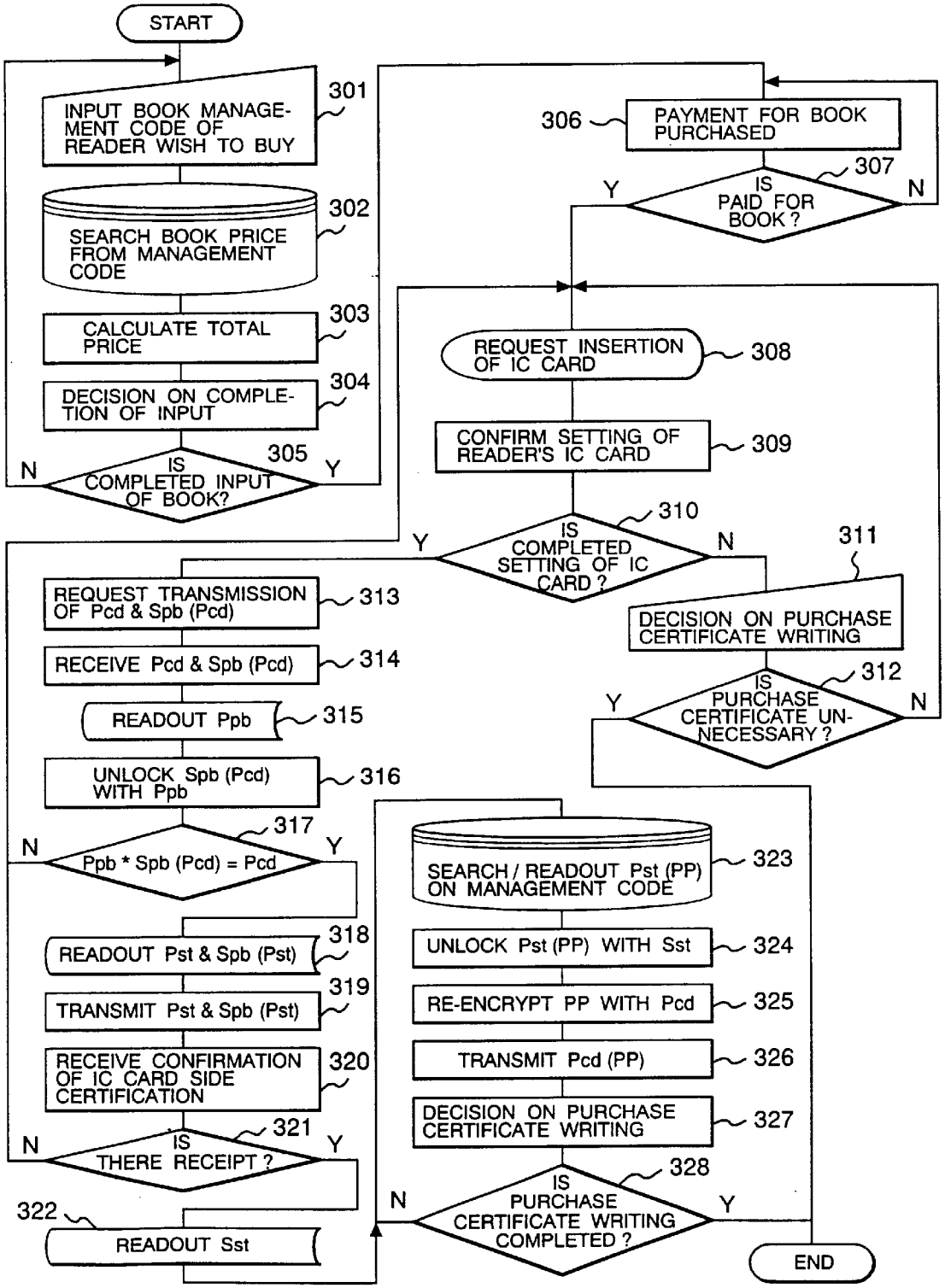
FIG. 14 is a flow chart for explaining flow of processes in the bookstore terminal device 2 when selling a book, in the embodiment of the present invention.

FIG. 14 shows a flow chart for showing a flow of processes in the bookstore terminal device 2 when the book is sold, in the embodiment of the present invention. Hereinafter, explanation will be given on the flow of the processes in the controller 21 of the bookstore terminal device 2, in the order of steps 301 to 328 shown in FIG. 14.

First of all, in the step 301, the reader inputs the management code of the book(s) which she/he wished to buy through the input device 27, such as a keyboard, a bar code reader or a scanner, etc. Then, in a step 302, the controller 21 searches for the related information recorded in the memory apparatus 24 from the management code, so as to read out the price of the book(s) and/or to calculate out total amount of the prices of the books in a step 303. Then, it makes a decision on the completion of inputting in a step 304, i.e., it decides on whether the inputting is completed for all of the books which are desired to buy, or not. If it is decided not to be completed in the inputting of the books in a step 305, the process is turned back to the step 301, while it is shifted to a step 306 if it is decided to be completed. In the step 306, it conducts the process for settling account for the price of the books, while continuing the process turning back to the step 306 until the completion of all the settlement processes in a step 307. When completing all the settlement processes, it proceeds the process to a step 308 so as to output a display on the display device 25, prompting to set the IC card 4 in the IC card reader/writer 28. In a step 309, it checks whether the IC card is set in the IC card reader/writer 28 or not, and in a step 310, it shifts the process to a step 313 if the IC card 4 is set in it, while to a step 311 if not. In the step 311, it requires to make an input of whether the purchase certificate(s) of the book (s) should be written into the IC card 4 or not. When the writing thereof is not necessary as the result of the input, the controller 21 ends the processes for the bookstore terminal device 2, while turns the process back to the step 308 when the writing is necessarily.

In a step 313, it transmits a request for transmission of the IC card public key Pcd and the IC card certifier Spb(Pcd) to the IC card 4. After receiving the IC card public key Pcd and the IC card certifier Spb(Pcd) in a step 314, the controller 21 reads out the publisher public key Ppb from the ROM 22 and/or the memory apparatus 24 in a step 315, and then unlocks the IC card certifier Spb(Pcd) in a step 316. When decided that the result of unlocking in the step 316 is consistent with the IC card public key Pcd received, in a step 317, it proceeds the process to a step 318, while it turns back to the step 308 when decided not.

In the step 318, the bookstore terminal device 2 reads out the bookstore terminal public key Pst and the bookstore terminal certifier Spb(Pst) from the ROM 32 and/or the memory apparatus 34, and transmits them toward the IC card 4 in a step 319. After that, it waits for receiving a confirmation from the IC card 4 in a step 320, which indicates success in certification for the bookstore terminal device 2. If there is no receipt thereof in a time period longer than a predetermined, the process is turned back to the step 308 in a step 321, while if there is the receipt thereof, it proceeds to a step 322. In the step 322, the controller 21 reads out the bookstore terminal secret key Sst from the ROM 22 and/or the memory apparatus 24. Further, it makes a search within the memory apparatus 34 upon the basis of the management code(s) of the book(s) which is inputted before in a step 323, so as to read out the purchase certificate(s) Pst(PP) which is related thereto and the related information thereof. Next, in a step 324, it unlocks at least the purchase certificate(s) Pst(PP) by the bookstore terminal secret key Sst, thereby to memorize the PP temporarily, and then in a step 325 the Pcd(PP) is obtained by encrypting the PP by the IC card public key Pcd again. In a step 326, at least this re-encrypted purchase certificate(s) Pcd(PP), and further the related information thereof, including the management code Mcode, are transmitted to the IC card 4 to be written therein.

In a step 327, it is decided whether the writing of all the purchase certificates into the IC card 4 are completed or not, and if decided not yet completed, in a step 328 the process is turned back to the step 323, while the processes for the bookstore terminal device 2 is completed or end, when decided all the writings are completed.

Figure 15:
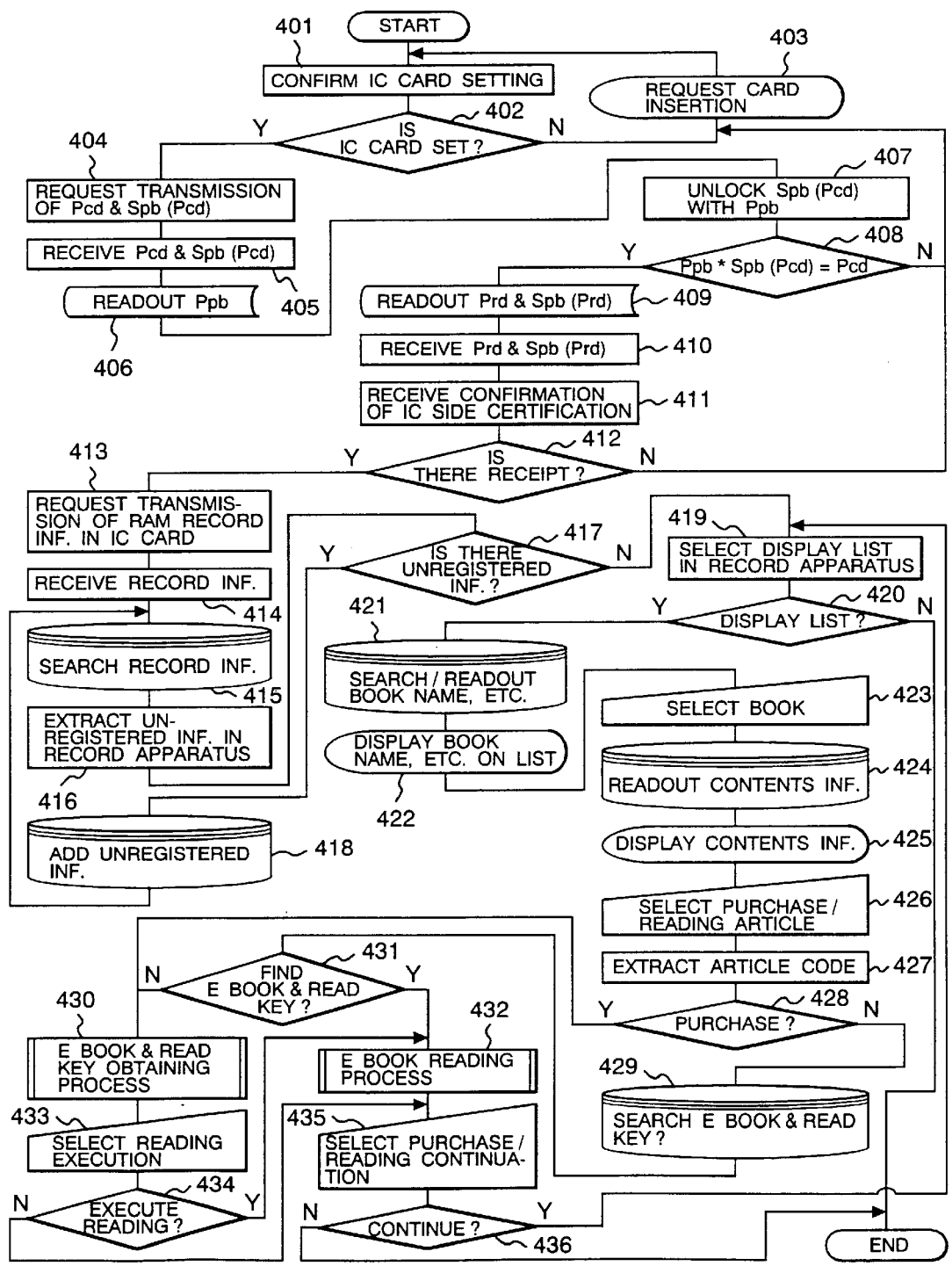
FIG. 15 is a flow chart for explaining flow of processes in the reader terminal device 3, in the embodiment of the present invention.

FIG. 15 shows a flow chart of showing a flow of processes in the reader terminal device 3, in accordance with the embodiment of the present invention. Hereinafter, explanation will be given on the flow of the steps in the controller 31 of the reader terminal device 3, in the order of steps 401–436 shown in the FIG. 15. However, the processes in the steps 430 and 432 will be explained in FIGS. 16 and 17, separately therefrom.

In a step 401, the controller 31 makes a check whether the IC card 4 is set in the IC card reader/writer 28, and it shifts the process to a step 404 when deciding that the IC card 4 is set in the step 402, while to a step 403 when deciding not. In the step 403, it provides an output display on the display device 35 for prompting to set the IC card 4 in the IC card reader/writer 28, and then turns the process back to the step 401.

In the step 404, the controller 31 transmits an order for transmitting the IC card public key Pcd and the IC card certifier Spb(pcd), to the IC card 4. In a step 405, it receives the same IC card public key Pcd and the IC card cetifier Spb(Pcd), and reads out the publisher public key Ppb from the program(s) in the ROM 32 and/or the memory apparatus 34 and/or from the program(s) under operating or running on the controller 31. In a step 407, it unlocks the IC card public certifier Spb(Pcd) by this publisher public key Ppb, and in a process 408, it shifts the process to a step 409 if deciding that the unlocked result is coincident with the IC card public key Pcd received, while turns it back to the step 403 if deciding not so.

In the step 409, the controller 31 reads out the reader terminal public key Prd and the reader terminal certifier Spb(Prd) from the ROM 32 and/or the memory apparatus 31, and/or from the program(s) under running on the controller 31, and then it transmits them to the IC card 4 in a step 410. It waits for receiving the confirmation of the certification from the IC card 4 in a step 411. And, if it is decided there is a receipt within a certain time period in a step 412, the process is shifted to a step 413, while is turned back to the step 403 if decided no signal is received.

In the step 413, it sends to the IC card 4 an order for transmitting the information related to the purchase certificate(s), including at least the purchase certificate(s) Pcd(PP) and/or the management code Mcode(s) which are recorded in the RAM 42 thereof. In a step 414, it receives the information mentioned above, and in a step 415, it conducts a search on the purchase certificate(s) and the information related thereto which are already stored in the memory apparatus 34 by the purchase certificate(s) Pcd(PP) and/or the management code Mcode which are received. In a step 416, a decision is made whether there are the purchase certificate(s) Pcd(PP) and/or the management code Mcode which cannot be found in the memory apparatus 34 or not, and in a step 417, the process is shifted to a step 418 when there is the information which cannot be found, while to a step 419 when all the information can be found. In the step 418, the information relating to the purchase certificate(s) Pcd(PP) and/or the management code Mcode which cannot be found are stored in the memory apparatus, including the information related thereto, and the process is turned back to the step 415.

In the step 419, it prompts the reader to select whether the list of the information should be displayed or not, including at least the book name Bname and/or the title of article Ctitle therewith. In a step 420, if selected to be displayed, the process is shifted to a step 421, while the processes for the reader terminal device 3 are completed or ended if selected not to be displayed in the step 420.

In the step 421, it reads out the information, including at least the book name Bname and/or the title of article Ctitle, under the condition of being related therewith. Next, in a step 422, it displays the above-mentioned information listed on the display device 35, and in a step 423, it receives the input in selection of books from the input device 37. In a step 424, it conducts a search on the related information stored within the memory apparatus 34 by the management code Mcode and/or the book name Bname in the above-mentioned list, thereby to read out the contents information TC. In a step 425, it displays the contents information TC on the display device 35, and in a step 426, it makes decision on selection of purchasing/reading (i.e., between purchasing and reading), also inputs the article to be the subject thereof from the input device 37, and then shifts the process to a step 427. Assuming if the title of article Ctitle is selected in the step 423, it doesn't matter that the process may be shifted from the step 423 to the step 427 directly. Further, with the articles selected, the article code Ccode is extracted by the contents information TC and/or the list in the step 427. In a step 428, a decision is made on the selection of purchasing/reading in the step 426. If in a case of the purchasing, the process is shifted to a step 430, while to a step 429 in a case other than that. In the step 429, searches are conducted on the electronic book Ck(EC) and the read key Pcd(Ck), which are stored in the memory apparatus 34, being related to the article code Ccode extracted in the step 427. When not found at least one of the electronic book Ck(EC) and the read key Pcd(Ck), in a step 431, the process is shifted to the step 430, while to a step 432 when both the electronic book Ck(EC) and the read key Pcd(Ck) are found.

After conducting the processes of obtaining the electronic book Ck(EC) and the read key Pcd(Ck) between the electronic book management system 1 and so on, the controller 31 receives from the input device 37 an input of selecting whether the obtained electronic book should be read or not, in a step 433. If selected the execution of reading, in a step 434 the process is shifted to the step 432, together with the electronic book Ck(EC) and the read key Pcd(Ck) selected from those obtained, while to a step 435 when being other than that.

In the step 432, the controller 31 conducts the process for reading of the electronic book, on selected the electronic book Ck(EC) and the read key Pcd(Ck). Thereafter, in the step 435, it receives from the input device 37 an input of selecting whether the process for purchasing or for reading should be continued or not. When it should be continued, the process is shifted to the step 419, while the processes for the reader terminal device 3 are ended when it is other than that.

Figure 16:
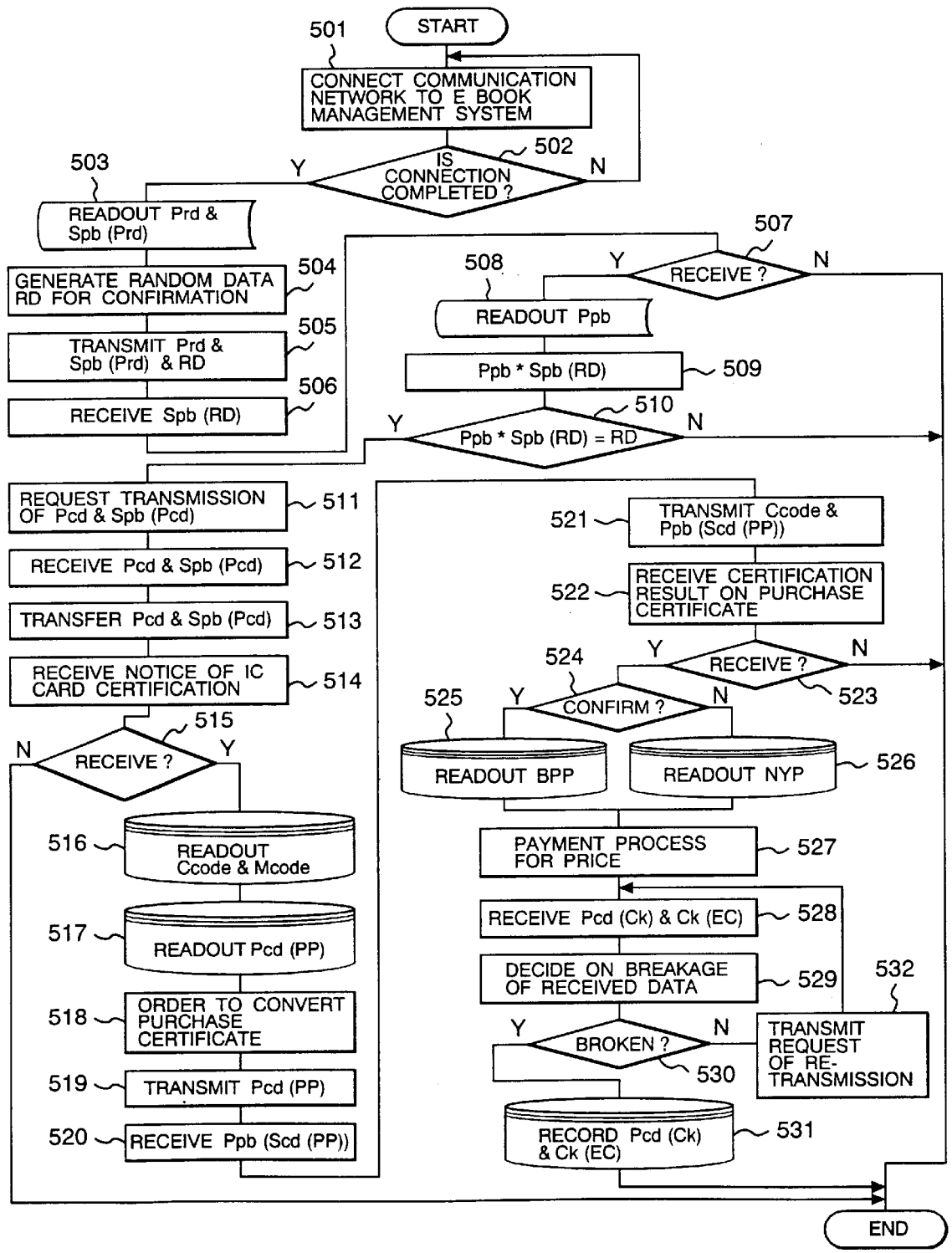
FIG. 16 is a flow chart for explaining further in more details of the processes of obtaining keys of electronic books and for reading thereof, which is described as the step 430 in FIG. 15, but in brief.

FIG. 16 shows a flow chart for showing further details of the process, in particular of the processes for obtaining the electronic book and key for reading thereof, which is described in brief as the step 430 in the FIG. 15. Hereinafter, the flow of the processes in the controller 31 of the reader terminal device 3 will be explained in an order of the steps 501–529 as shown in FIG. 16.

In a step 501, the controller 31 connects the communication apparatus 36 to the communication circuit for the electronic book management system 1. If the decision indicative of completion in the connection can be obtained in a step 502, the process is shifted to a step 503, while is turned back to the step 501 if being otherwise.

In the step 503, the controller 31 reads out the reader terminal public key Prd and the reader terminal certifier Spb (Prd) from the program(s) in the ROM and/or the recording device 34, and/or from the program(s) under running on the controller 31, and in a step 504, the random data RD is generated to be memorized temporarily. In a step 505, the controller 31 transmits the reader terminal public key Prd and the reader terminal certifier Spb (Prd) and the random data RD to the electronic book management system 1, and waits for receiving the publisher certifier Spb(RD) in a step 506. When receiving it in a predetermined time period, the controller 31 shifts the process to a step 508, while it ends the processes for obtaining the electronic book and key for reading thereof when otherwise (i.e., when not receiving it).

In the step 508, the controller 31 reads out the publisher public key Ppb from the ROM 32 and/or the memory apparatus 34, and/or from the program under running on the controller 31, so as to unlock the publisher certifier Spb(RD) in a step 509. When it is decided that the unlocked result is consistent with the random data RD memorized temporarily in advance, in a step 510, the process is shifted to a step 515 with considering that the certification of the electronic book management system 1 is also completed, while the processes for obtaining the keys of the electronic book and for reading thereof is completed or ended when decided to be inconsistent.

In a step 511, the controller 31 sends an order to the IC card 4 set, indicating to transmit the IC card public key Pcd and the IC card certifier Spb(Pcd). Next, it transmits the IC card public key Pcd and the IC card certifier Spb(Pcd), which are received in a step 512, to the electronic book management system 1 in a step 513. Further, in a step 514, it waits for receiving the notice of certifying the IC card from the electronic book management system 1. When receiving it in a predetermined time period, the controller 31 shifts the process to a step 516, while it ends the processes for obtaining the electronic book and key for reading thereof when otherwise (i.e., when not receiving it).

In a step 516, it reads out the article code Ccode which is read out previously before starting the processes for obtaining the keys of the electronic book and for reading thereof, by searching for the management code Mcode related thereto from the memory apparatus 34, and further in a step 517, it reads out the purchase certificate Pcd (PP) which is related to the management code Mcode by searching thereof. In a case where the article code Ccode and the purchase certificate Pcd(PP) are related directly, the steps 516 and 517 can be made one. Next, in a step 518, the controller 31 transmits an order of converting the purchase certificate, to the IC card 4, and then it transmits the purchase certificate Pcd(PP) to the IC card 4 in a step 519.

Receiving the Ppb(Scd(PP)) converted by the IC card 4 in a step 520, the controller 31 transmits to the electronic book management system 1, at least the above-mentioned article code Ccode, and further the purchase certificate Ppb (Scd (PP)) together with the management code Mcode, in a step 521. In a step 522, the controller 31 waits for receiving of the certification result of the purchase certificate from the electronic book management system 1, and it shifts the process to a step 524 when deciding it receives in a predetermined time period in a step 523, while completes or ends the processes for obtaining the keys of the electronic book and for reading thereof when deciding not received.

In a step 524, the service which the reader can receive is changed by deciding the certification result of the purchase certificate received. Here, an example is explained where the price of the electronic book is changed to the price NYP for the non-purchaser depending upon the existence of the purchase certificate. In a step 524, when deciding that the certificate can be confirmed, the process is shifted to a step 525, while to a step 526 when deciding not so, respectively. In the step 525, the controller 31 reads out the purchaser price BPP related to the article code Ccode from the information stored in the memory apparatus 34 by searching thereof, and shifts the process to a step 527. While, in the step 526, it reads out the non-purchaser price NYP related to the article code Ccode from the information stored in the memory apparatus 34 by searching thereof, and shifts the process to a step 527. In the step 527, it conducts the process for paying the price to the electronic book management system 1 by use of either one of the purchaser price BPP and the non-purchaser price NYP, i.e., the price of the electronic book which is read out. For this process of payment for the price can be used the conventional technologies, such as settlement by the electronic money system, credit payment, payment from an account, payment by cash, etc., therefore the explanation thereof will be omitted here.

After completing the step 527, the controller 31 waits for the transmission of data from the electronic book management system 1, and receives either one or both of the electronic book Ck(EC) and the read key Pcd(Ck) which are needed, in a step 528. A decision is made on the breakage in the received data by means of such the parity check, in a step 529, and in a step 530, when no breakage can be acknowledged, the process is shifted to a step 531, while to a step 532 when damage can be acknowledged. In the step 532, the controller 31 sends a request for re-transmitting the damaged portion or a whole of the data damaged to the electronic book management system 1, and turns back the process to the step 528. In the step 531, it stores the electronic book Ck(EC) and the read key Pcd(Ck) in the memory apparatus 34 in relation to the article code Ccode and so on, thereby completing the processes for obtaining the electronic book and key for reading thereof.

In the step 525, in a case where the reader without the purchase certificate should be inhibited from obtaining the electronic book, it doesn't matter that the processes for obtaining the electronic books and keys for reading thereof can be completed or ended in the step where the certificate cannot be confirmed. Also, in the step 525, in a case where the price of the electronic book should be free for the reader who has the purchase certificate, the process may be shifted to the step 528 when the certificate can be confirmed. In the step 525 and/or in the step 526, the purchaser price BPP and the non-purchaser price NYP may be ones which are received from the electronic book management system 1, but not ones which are searched and read out from the memory apparatus 34.

Figure 17:
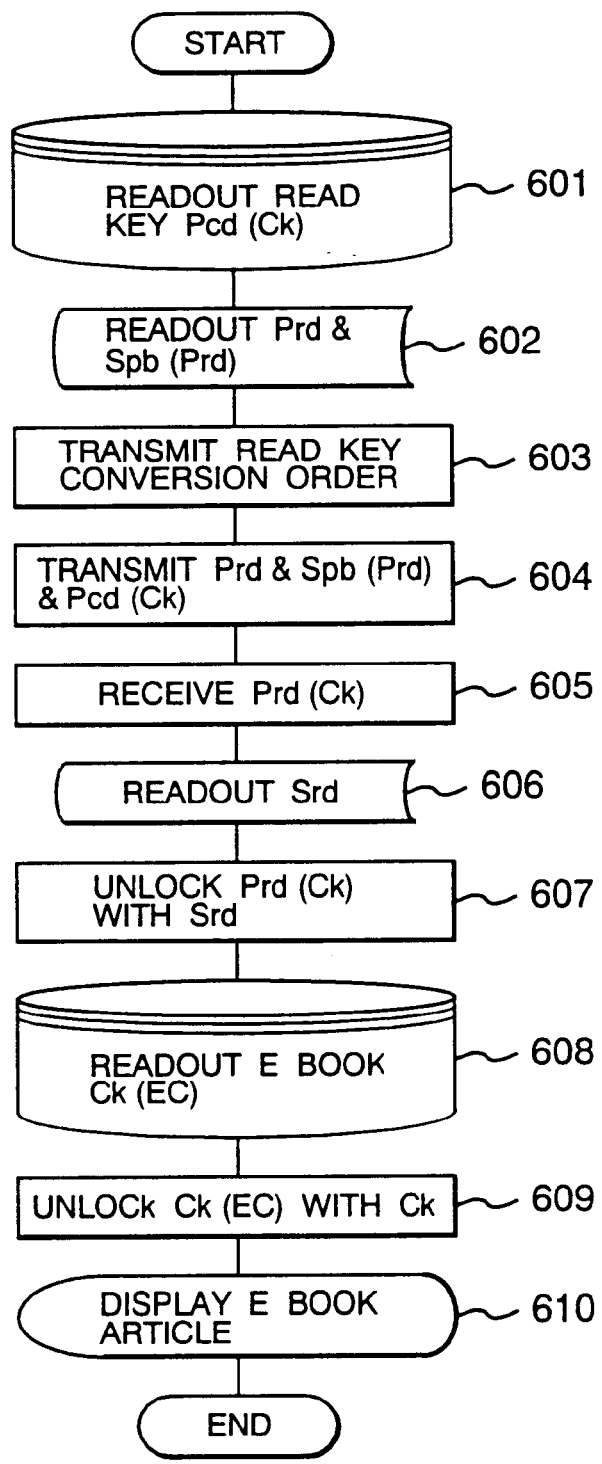
FIG. 17 is a flow chart for explaining further in more details of the processes for reading the electronic books, which is described as the step 432 in FIG. 15, but in brief.

FIG. 17 shows a flow chart for showing the flow of the process in more details, in particular of the reading processes of electronic books which is described in brief as the step 432 in the FIG. 15. Hereinafter, the processes in the controller 31 of the reader terminal device 3 will be explained in the order of steps 601–610 shown in FIG. 17.

In a step 601, the controller 31 conducts search and reading of the read key Pcd(Ck), being related to the article code Ccode which is read out in advance, from the information stored in the memory apparatus 34. Next, in a step 602, the controller 31 reads out the reader terminal public key Prd and the reader terminal certifier Spb(Prd) from the ROM 32 and/or the memory apparatus 34, and/or from the program(s) under running on the controller 31.

Further, the controller 31 transmits to the IC card 4 an order for converting the read key, in a step 603, and in the following step 604, it transmits the reader terminal public key Prd and the reader terminal certifier Spb(Prd) and the read key Pcd(Ck). In a step 605, it receives the read key Prd(Ck) which is obtained by converting the encryption key into the reader terminal public key Prd, from the IC card 4. In a step 606, the reader terminal secret key Srd is read out from the ROM 32 and/or the memory apparatus 34, and/or from the program(s) under running on the controller 31, and in a step 607, by unlocking the read key Prd(Ck) which is received in advance, it is memorized into a data register or the like temporarily.

In a step 608, the controller 31 reads out the electronic book Ck(EC) related to the above-mentioned article code Ccode from the information stored in the memory apparatus 34 by searching thereof. Further in a step 609, it unlocks the electronic book Ck(EC) by use of the above-mentioned Ck, and in a step 610, it transmits the article of the electronic book and/or the picture(s) which are picked up to the display device 35, so as to make them readable thereon. After completing the reading in the step 610, the processes for reading the electronic books are also completed or ended.

In this manner, according to the present embodiment, the electronic book management system is able to obtain the information indicative of whether she/he has already bought the book(s) which is related to the electronic book(s), respectively, for each of the readers who wish to obtain the electronic book(s), thereby enabling to change the services to be provided to the readers appropriately and/or minutely. Also for the reader, by the related information which can be obtained together with the purchase certificate(s), it is easy to obtain the electronic books, in particular, at least the electronic books, on which the purchaser of that books can receive the service from the electronic book management system.

Further, in the present embodiment, the purchase certificate of the book(s) which is used for deciding the change of the services in the electronic book management system cannot be used without the IC card owned by the reader of the book(s), therefore it has an advantage of avoiding unfair and/or illegal use by the third person.

Also, the electronic book(s) which the reader obtains, since it is always written in code or encrypted, except for when being on the temporary memory for the reading, therefore there can be obtain an effect of avoiding unfair and/or illegal reading by the third person who doesn't have the read key by her/himself, as well as preventing from the unfair and/or illegal modification thereof.

Figure 18:
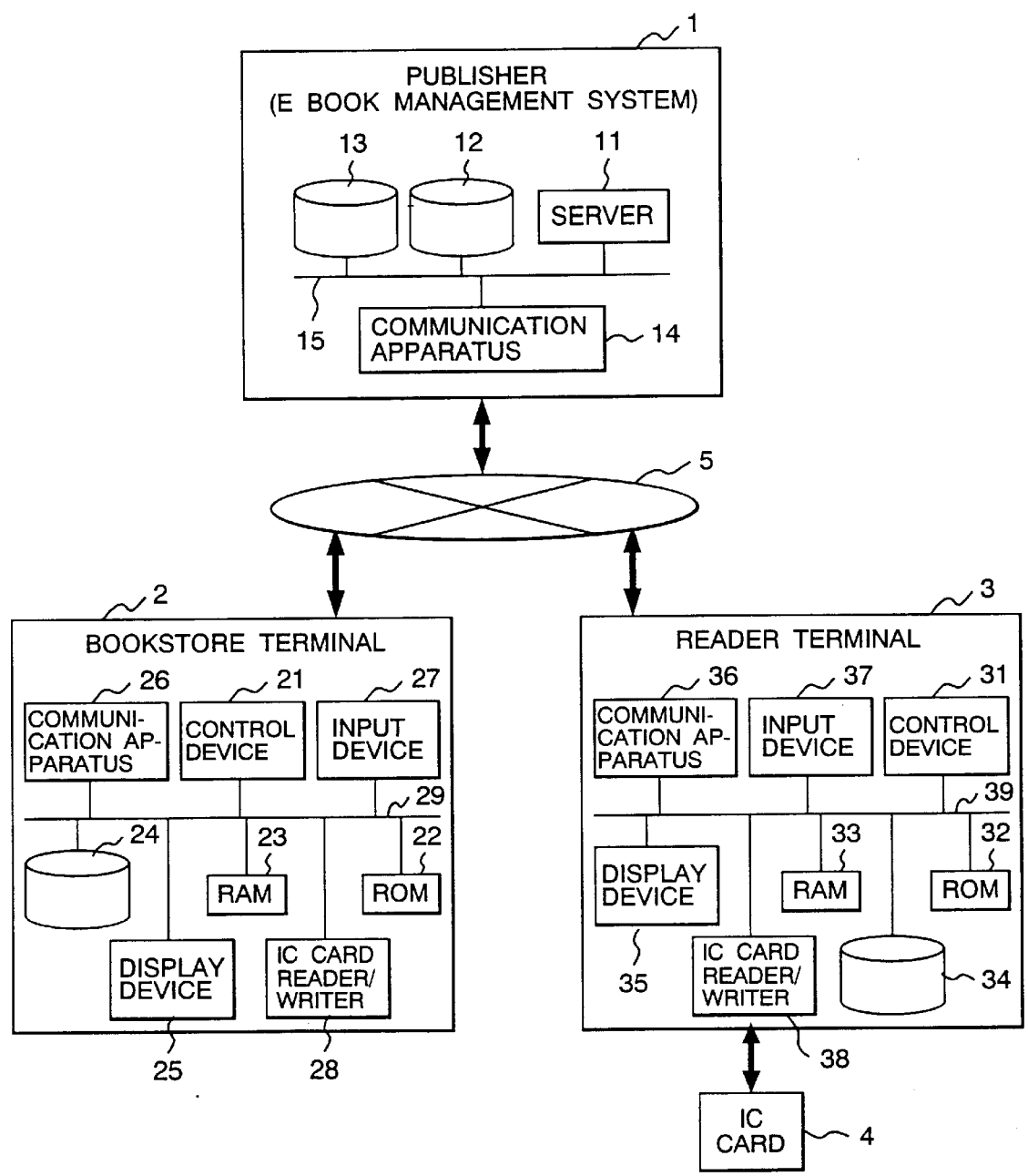
FIG. 18 is an outline view of an electronic book management system, according to a second embodiment of the present invention.

FIG. 18 is a view of showing an outline of the system configuration, according to a second embodiment of the present invention. In the figure, the same reference numerals, being same in the other figures, indicate the same apparatus/device and the same system.

The difference of the second embodiment from the first embodiment mentioned above lies in an aspect that the reader doesn't go to a storefront of the bookstore but connects from the reader terminal device 3 to the bookstore terminal 2 through the communication network 5, thereby to proceed the purchase order of the book(s) and the payment for the price thereof through the communication network, as well as to receive issue of the purchase certificate(s) also through the communication network. In this instance, the book(s) on which the purchase order is received at the bookstore terminal device 3, will be distributed by means of a mail and/or delivery service, later. In the present embodiment, there is no necessity that the bookstore having the bookstore terminal device 2 necessarily displays the books actually on the storefront. Also, the bookstore terminal device 2 may be provided with the IC card reader for use in reading of the IC card of the reader. Also, in a case where a procedure in which the book(s) is delivered in exchange for the price is applied as the process for payment, the electronic book(s) may be transmitted from the bookstore terminal device 2 to the reader terminal device 3 other day after finishing the confirmation on the receipt thereof, separately.

Figure 19:
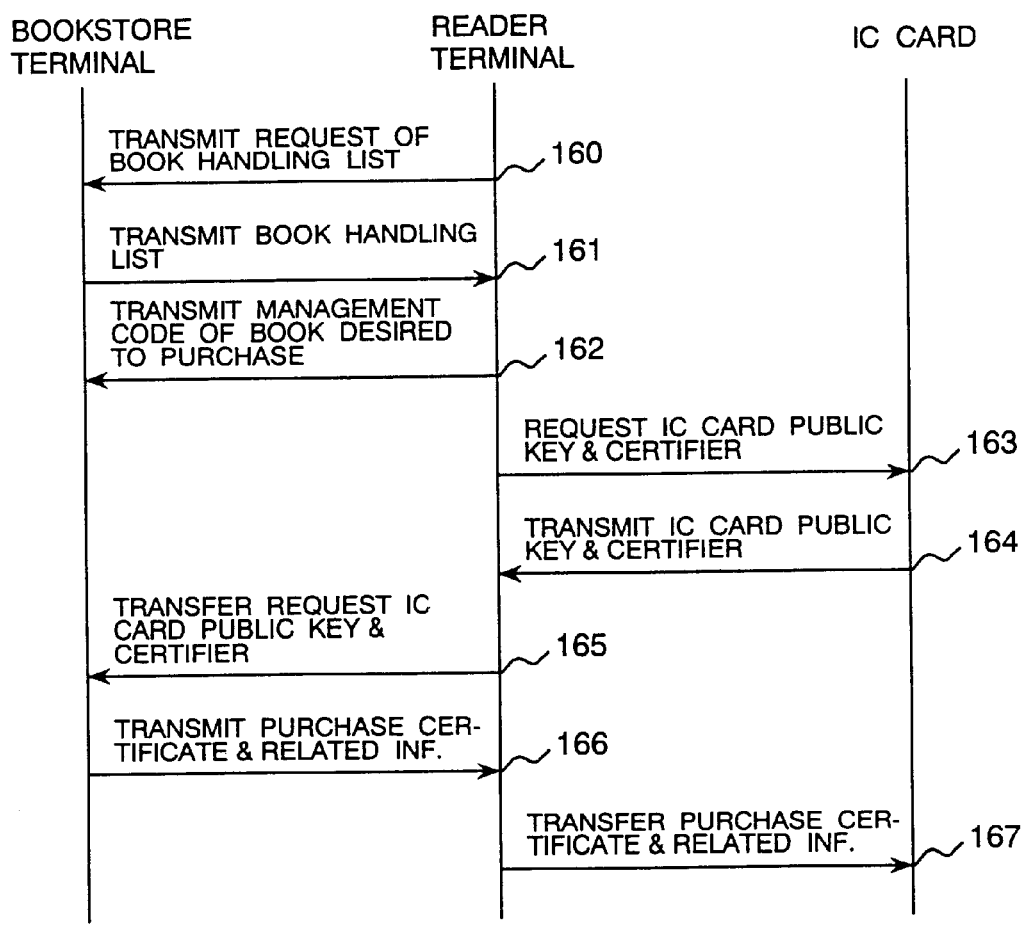
FIG. 19 is a view for explaining in brief the information, being responded among three, the bookstore terminal device 2, the reader terminal device 3 and the IC card 4, when a reader orders to purchase a book and receives an issue of the purchase certificate thereof.

FIG. 19 is a view for explaining the information responded among three, i.e., the bookstore terminal device 2, the reader terminal device 3 and the IC card 3, in brief, in particular when the reader orders a purchase of books and receives an issue of the purchase certificate thereof, in the second embodiment. The means being conducted conventionally are used, as the processes for connecting and cutting-off among the elements and for paying for the price, therefore the description of them will be omitted here.

After the processes for connecting between the reader terminal device 3 and the IC card 4 and for connecting between the bookstore terminal device 2 and the reader terminal device 3 through the communication network 5, the reader terminal device 3 requires the bookstore terminal device 2 to transmit a part and/or all of the list of books which can handle (160). The designation of the list in this instance may be made by a result of a keyword search or by category of each. In the list are contained at least the book name(s) Bname and the price BP, and further contained the management code(s) Mcode.

The bookstore terminal device 2, receiving the request for the handling list of books transmits the handling list of books requested in return thereto (161). The reader terminal device 3 selects the book(s) from the received handling list of books, which the reader wishes to buy, and/or inputs the information which she/he obtains separately, then transmits the name of that book(s) Bname to the bookstore terminal 2 (162).

Here, with the book which the reader wishes to buy, the payment process for the price thereof is conducted at least between the bookstore terminal device 2 and the reader terminal device 3.

Next, the reader terminal device 3 requires the IC card 4 to transmit the IC card public key Pcd and the IC card certifier Spb(Pcd) (163). After receiving the IC card public key Pcd and the IC card certifier Spb(Pcd) (164), the reader terminal device 3 transmits them to the bookstore terminal device 2 (165).

After unlocking the received IC card certifer Spb(Pcd) by the publisher public key Ppb owned thereby, the bookstore terminal device 2 compares it to the IC card public key Pcd to certify, and converts the encryption key(s) for the purchase certificate(s) Pst(PP) of the book(s), at least, on which is/are received the purchase order(s), thereby to transmit a new purchase certificate(s) Pcd(PP) together with the information related thereto, including the management code Ccode thereof, to the reader terminal device 3 (166).

The reader terminal device 3 stores into the memory apparatus 34 the received purchase certificate(s) Pcd(PP) in relation to the related information thereof, and if necessary, executes the transmission and/or interruption of the purchase certificate(s) Pcd(PP) and the related information thereof (167).

In this manner, according to the second embodiment of the present invention, it is possible for the reader to purchase the books and to obtain the purchase certificate thereof with ease from a long distance, without going to the bookstore directly. And, for the bookstore, even if not keeping the stock at the time point when receiving the purchase order from the reader, it is possible to take such steps that the ordering process is conducted after receiving the purchase order and the IC card public key Pcd and the IC card certifier Spb (Pcd) from the reader terminal device 3, and then the delivery of the book and the transmission of the purchase certifiace Pcd(PP) thereof will be done other day.

The invention disclosed in the first and the second embodiments can also be applied to similar electronic information other than that of the publications without any problem.

As is fully explained in the above, according to the present embodiment, the electronic book management system is able to obtain the information indicative of whether she/he has already bought the book(s) being related to the electronic book(s) respectively, for each of the readers who wish to obtain the electronic book(s), thereby enabling to change the service to be provided to the readers appropriately and/or minutely. Also for the reader, by the related information which can be obtained together with the purchase certificate(s), it is easy to obtain the electronic books, in particular at least the electronic books, on which the purchaser of the books can receive the service from the electronic book management system.

Further, according to the present invention, the purchase certificate of the book(s) which is used in decision on change of the services in the electronic book management system cannot be used without the IC card owned by the reader of the book(s), therefore it has an advantage of avoiding unfair and/or illegal use by the third person.

Also, the electronic book(s) which the reader obtains, since it is always written in code or encrypted, except for when being on the temporary memory for the reading, therefore there can be obtain an effect of avoiding unfair and/or illegal reading by the third person who doesn't have the read key for her/himself, as well as preventing from the unfair and/or illegal modification thereof.

What is claimed is:

1. An electronic information distributing system for distributing an electronic book as an electronic information through communication networks and/or broadcasting networks for purpose of trade, in relation with a paper book containing a same contents in said electronic book, comprising:
   an electronic information management means for managing information relating to desire to purchase the electronic book, and certification and service thereof;
   an information sales means for storing, processing and distributing auxiliary information to be attached to the electronic book information to be served and/or attached for serving thereof; and
   an information transmission means such-as of IC card for transmitting information from said information sales means, wherein said electronic information management means further comprises:
   a purchase certificate distributing means for distributing a purchase certificate to a purchaser who bought the paper book;
   a purchase certificate deciding means for deciding the presence of said purchase certificate of a person who desires to obtain the electronic book as the electronic information; and
   means for providing a plurality of services for the person who desires to obtain the electronic book as the electronic information, depending upon the presence of said purchase certificate, a discount rate to a person who wishes to buy the electronic book being changed upon the presence of the purchase certificate.

2. An electronic information distributing system as defined in the claim 1, further comprising:
   a purchase certificate distributing means for distributing a purchase certificate;
   a purchase certificate deciding means for deciding presence of said purchase certificate of a person who desires to obtain the electronic information; and
   means for providing a plurality of services for the person who desires to obtain the electronic information.

3. An electronic information distributing system as defined in the claim 1, further comprising:
   an electronic information storing means for storing electronic information including a purchase certificate therein;
   an electronic information readout means for obtaining electronic information relating to the information purchased from said electronic information storing means; and
   an electronic information service means for serving said electronic information obtained to the purchaser.

4. An electronic information distributing system as defined in the claim 1, wherein there is provide provided an electronic information service receiving mean means for receiving service from said electronic information management means for each of said users.

5. An electronic information distributing system as defined in the claim 1, wherein said electronic information transmission means comprises an electronic information storing means for storing electronic information including purchase certificate therein.

6. An electronic information distributing system as defined in the claim 1, wherein said electronic information transmission means comprises a communication means for transmitting information with said information sales means through communication networks.

7. An electronic information distributing system as defined in the claim 2, wherein said electronic information management means comprises an encryption means for encrypting the electronic information by using an encryption key which is obtained from the person desirous to obtain the electronic information.

8. An electronic information distributing system as defined in the claim 3, wherein said information sales means comprises an encryption means for encrypting the electronic information by using an encryption key which is obtained from the person purchasing the information.

9. An electronic information distributing system as defined in the claim 3, wherein said information sales means comprises:
   an unlocking means for unlocking the encrypted information obtained from said electronic information management means; and
   an encryption means for encrypting the electronic information by using an encryption key obtained from said purchaser of the information.

10. An electronic information distribution system according to claim 1 wherein:
    said information sales means and said information transmission means have their own specific public and secret keys, respectively;
    said electronic information management means provides the purchase certificate to said information sales means after encrypting it with the public key which said information sales means owns; and
    said information sales means transmits the electronic information to said information transmission means, including the re-encrypted purchase certificate being re-encrypted with the public key of said information transmission means after unlocking it with the secret key owned thereby, when providing the electronic information attached to the purchased information to the purchaser of the information.

11. An electronic information distributing system according to claim 1 further comprising an electronic information service receiving means, including:
    an electronic information storing means for storing, at least, electronic information obtained from said information transmission means and/or electronic information caused by and/or attached to the service received from said electronic information management means;

an encryption key search means for searching and obtaining an encryption key being able to unlock said encrypted information which are stored in said electronic information storing means; and an unlock means for unlocking said encrypted information by using the encryption key obtained by said encryption key search means.

12. A store terminal device for use in an electronic information distribution system, for distributing an electronic book as an electronic information through communication networks and/or broadcasting networks for purpose of trade, in relation with a paper book containing a same contents in said electronic book, comprising:

an electronic information management means for managing information relating to desire to purchase the electronic book, and certification and service thereof;

an information sales means for storing, processing and distributing auxiliary information to be attached to the electronic book information to be served and/or attached for serving thereof;

an information transmission means of IC card for transmitting information from said information sales means;

an electronic information storing means for storing electronic information including a purchase certificate therein;

an electronic information readout means for obtaining electronic information relating to the information purchased from said electronic information storing means;

an encryption means for encrypting at least a part of said electronic information obtained by using an encryption key obtained from the purchaser of the information; and an electronic information providing means for providing said electronic information to the purchaser, wherein said electronic information management means further comprises:

a purchase certificate distributing means for distributing a purchase certificate to a purchaser who bought the paper book;

a purchase certificate deciding means for deciding the presence of said purchase certificate of a person who desires to obtain the electronic book as the electronic information; and means for providing a plurality of services for the person who desires to obtain the electronic book as the electronic information, depending upon the presence of said purchase certificate, a discount rate to a person who wishes to buy the electronic book being changed upon the presence of the purchase certificate.

13. A store terminal device as described in the claim 12, wherein in said electronic information storing means stores at least one or more of an information to be sold, a name of the information to be sold, and a management code of the information to be sold, in relation to the purchase certificate of said information.

14. An IC card device for use in an electronic information distributing system, for distributing an electronic book as an electronic information through communication networks and/or broadcasting networks for purpose of trade, in relation with a paper book containing a same contents in said electronic book, comprising:

an electronic information management means for managing information relating to desire to purchase the electronic book, and a certification and service thereof;

an information sales means for storing, processing and distributing auxiliary information to be attached to the electronic book information to be served and/or attached for serving thereof; and an information transmission means such-as of IC card for transmitting information from said information sales means, wherein said IC card device comprising:

a key storing means for storing at least a signal key owned by itself; and an unlock means for unlocking obtained encrypted information with an encryption key obtained from said key storing means and/or an encryption key obtained from an outside, wherein said electronic information management means further comprises:

a purchase certificate distributing means for distributing a purchase certificate to a purchaser who bought the paper book;

a purchase certificate deciding means for deciding the presence of said purchase certificate of a person who desires to obtain the electronic book as the electronic information; and means for providing a plurality of services for the person who desires to obtain the electronic book as the electronic information, depending upon the presence of said purchase certificate, a discount rate to a person who wishes to buy the electronic book being changed upon the presence of the purchase certificate.

15. An IC card device as described in the claim 14, further comprising:

an encryption means for encrypting the information obtained from said unlock means with the encryption key obtained from said key storing means and/or the encryption key obtained from the outside.

16. An IC card device as described in the claim 15, further comprising:

an electronic information storing means for storing 10 electronic information obtained from an outside therein.

17. An information terminal device for use in an electronic information distributing system, for distribution an electronic book as an electronic information through communication networks and/or broadcasting networks for purpose of trade, in relation with a paper book containing a same contents in said electronic book, comprising:

an electronic information management means for managing information relating to desire to purchase the electronic book, and certification and service thereof;

an information sales means for storing, processing and distributing auxiliary information to be attached to the electronic book information to be served and/or attached for serving thereof;

an information transmission means such-as of IC card for transmitting information from said information sales means; and an electronic information service receiving mean for receiving service from said electronic information management means for each of users;

an electronic information storing means for storing, at least, electronic information obtained from said information transmission means and/or electronic information caused by and/or attached to the service received from said electronic information management means;

an encryption key search means for searching and obtaining an encryption key being able to unlock said encrypted information which are stored in said electronic information storing means; and an unlock means for unlocking said encrypted information by using the encryption key obtained by said encryption key search means, wherein said electronic information management means further comprises:

a purchase certificate distributing means for distributing a purchase certificate to a purchaser who bought the paper book;

a purchase certificate deciding means for deciding the presence of said purchase certificate of a person who desires to obtain the electronic book as the electronic information; and means for providing a plurality of services for the person who desires to obtain the electronic book as the electronic information, depending upon the presence of said purchase certificate, a discount rate to a person who wishes to buy the electronic book being changed upon the presence of the purchase certificate.

* * * * *